US010776748B2

(12) United States Patent
Jones et al.

(10) Patent No.: US 10,776,748 B2
(45) Date of Patent: Sep. 15, 2020

(54) COMMUNICATION ANALYSIS FOR OBTAINING LOADS

(71) Applicant: CARGO CHIEF ACQUISITION INC., San Francisco, CA (US)

(72) Inventors: Russell Jones, Millbrae, CA (US); Kirk Franzen, Millbrae, CA (US); Kyle M. Wilson, Millbrae, CA (US); Michael Bykhovsky, Millbrae, CA (US); Srinivasa Sarma, Millbrae, CA (US); Abtin Hamidi, Millbrae, CA (US); Soob Patel, Millbrae, CA (US)

(73) Assignee: CARGO CHIEF ACQUISITION INC., San Francisco, CA (US)

( * ) Notice: Subject to any disclaimer, the term of this patent is extended or adjusted under 35 U.S.C. 154(b) by 278 days.

(21) Appl. No.: 16/046,749

(22) Filed: Jul. 26, 2018

(65) Prior Publication Data

US 2018/0349849 A1 Dec. 6, 2018

Related U.S. Application Data

(63) Continuation-in-part of application No. 14/926,893, filed on Oct. 29, 2015, now Pat. No. 10,074,065,
(Continued)

(51) Int. Cl.
*G06Q 10/08* (2012.01)
*G06Q 30/08* (2012.01)
(Continued)

(52) U.S. Cl.
CPC ....... *G06Q 10/08345* (2013.01); *G06N 20/00* (2019.01); *G06Q 10/0833* (2013.01);
(Continued)

(58) Field of Classification Search
None
See application file for complete search history.

(56) References Cited

U.S. PATENT DOCUMENTS 7,478,055 B2 * 1/2009 Goino ............... G06Q 30/0601
705/26.3
8,566,214 B2 * 10/2013 Cavanaugh ........... G06Q 30/08
705/37
(Continued)

FOREIGN PATENT DOCUMENTS

KR 101637504 B1 * 7/2016

OTHER PUBLICATIONS

Sumathi, S., et al., "Design of a hybrid model classifier for data mining applications," Proc. SPIE 4057, Data Mining and Knowledge Discovery: Theory, Tools, and Technology II, Apr. 6, 2000. (Year: 2000).*
(Continued)

*Primary Examiner* — Nicholas D Rosen
(74) *Attorney, Agent, or Firm* — Nath, Goldberg & Meyer; Jerald L. Meyer; Stanley N. Protigal

(57) ABSTRACT

Communications are received from a transportation service provider and are parsed for data indicating capacity data. The data is then matched to a stored format for capacity data and the parsed data is extracted from the data matched to the stored format to a preferred data format, and reviewed to determine if the stored data reflects capacity indicated by the received communication. The data is then combined with preference data and performance data concerning the transportation service data and used to automatically match a demand for transportation services with the capacity to provide the transportation services.

18 Claims, 11 Drawing Sheets

Related U.S. Application Data which is a continuation-in-part of application No. 14/625,302, filed on Feb. 18, 2015, now abandoned.

(51) Int. Cl.
  *G06Q 30/06* (2012.01)
  *G06N 20/00* (2019.01)

(52) U.S. Cl.
  CPC ..... *G06Q 10/0834* (2013.01); *G06Q 10/0838* (2013.01); *G06Q 30/0611* (2013.01); *G06Q 30/08* (2013.01); *G06Q 10/083* (2013.01)

(56) References Cited

U.S. PATENT DOCUMENTS

| | | | | |
|---|---|---|---|---|
| 8,904,479 | B1* | 12/2014 | Johansson | G06F 21/36 |
| | | | | 726/2 |
| 9,082,144 | B2* | 7/2015 | Jones | G06F 16/24575 |
| 9,691,091 | B2* | 6/2017 | Jones | G06Q 30/0611 |
| 9,996,814 | B2* | 6/2018 | Jones | G06F 16/24575 |
| 10,074,065 | B2* | 9/2018 | Jones | G06Q 30/08 |
| 10,282,694 | B2* | 5/2019 | Jones | G06Q 10/08355 |
| 10,417,613 | B1* | 9/2019 | Brisebois | G06Q 10/1095 |
| 10,642,854 | B2* | 5/2020 | Pattnaik | G06F 9/38 |
| 10,657,158 | B2* | 5/2020 | Sheng | G06F 16/93 |
| 2001/0056396 | A1* | 12/2001 | Goino | G06Q 40/04 |
| | | | | 705/37 |
| 2003/0046133 | A1* | 3/2003 | Morley | G06Q 10/0639 |
| | | | | 705/7.12 |
| 2009/0099953 | A1* | 4/2009 | Cavanaugh | G06Q 30/08 |
| | | | | 705/37 |
| 2009/0138415 | A1* | 5/2009 | Lancaster | G06N 5/04 |
| | | | | 706/11 |
| 2011/0221565 | A1* | 9/2011 | Ludlow | G07C 9/22 |
| | | | | 340/5.6 |
| 2017/0235735 | A1* | 8/2017 | Ignatyev | G06F 16/22 |
| | | | | 706/12 |
| 2018/0101584 | A1* | 4/2018 | Pattnaik | G06F 16/86 |
| 2018/0101609 | A1* | 4/2018 | Manzano Macho | G06N 20/00 |
| 2018/0144042 | A1* | 5/2018 | Sheng | G06F 16/93 |
| 2018/0349776 | A1* | 12/2018 | Raamadhurai | G06N 5/025 |
| 2019/0130306 | A1* | 5/2019 | Singh | G06F 7/023 |

OTHER PUBLICATIONS

Machine translation of Lee et al., KR-10-1637504-B1, translated Jun. 11, 2020. (Year: 2020).*

* cited by examiner

COMMUNICATION ANALYSIS FOR OBTAINING LOADS

RELATED APPLICATIONS

The present patent application is a Continuation in Part of U.S. patent application Ser. No. 14/926,893, filed Oct. 29, 2015, now U.S. Pat. No. 10,074,065. Application Ser. No. 14/926,893 claims priority to U.S. patent application Ser. No. 14/625,302 filed Feb. 18, 2015, and both applications are assigned to the assignee hereof and are incorporated by reference herein.

BACKGROUND

Field

This disclosure relates to electronic communication analysis as relates to logistics, aggregation of data and bidding for logistics handling. More specifically, the disclosure relates to communication analysis for augmenting data aggregation useful in associating the availability of a transportation service provider (TSP), driver or transportation resource with demand for transportation. A specific non-limiting disclosed example is email communication related to providing transportation services, in which information from the communication is used for data aggregation useful in identifying availability of a transportation service provider (TSP), driver or transportation resource, and integrating the availability with a bidding system for providing transportation services.

Background

Shipping has historically been executed through a variety of private Transportation Service Providers (TSPs) as carriers, in which the TSPs use different business models. Also included are large trucking companies, owner-operators, private fleet carriers, courier and shipment consolidation companies and shipment transport companies following other business models. There are differences in transport capabilities, such as non-bulk cargo (boxes and pallets), bulk, liquid, reefer, flatbeds and cargo container frames. In addition, there are varying capacities within each category.

For purposes of transportation services, a "shipper" may be any entity or individual who requests transportation services from a TSP. The shipper may be the entity providing goods needing transport. In the alternative, the shipper may be a party receiving goods, and who arranges for transportation services of the goods. The passenger transportation equivalent would be the passenger, although in some cases, the logistical arrangements are fully made without the direct involvement of the passenger. For purposes of this disclosure, "shipper" is intended to mean anyone who commissions transportation services. If specific categories of transportation are specified, the meaning of "shipper" would be limited as required by the categories.

A transportation service provider or TSP is a business entity that provides transportation. In some cases, the TSP is an independent driver (owner-operator) or similar, whereas in other case, the TSP performs most of the contract functions in arranging for loads and scheduling. For purposes of the present disclosure and the claims, unless otherwise specified, TSPs comprise companies, as well as independent drivers (owner operators), with the terms used interchangeably.

Similarly, the driver in many cases is scheduled by a dispatcher or by a scheduler at the TSP. As used herein, the functions performed by the "driver" (other than driving the truck) are also intended to describe the functions performed by people or groups of people having other functions at the TSP having other job descriptions.

Typical shipping is accomplished by directly engaging a transport company, such as a package delivery service, shipping by private fleet controlled by the shipper, brokering services and other transport arrangements. In many cases, the transport is performed on a bid basis, using TSPs such as common carrier haulers.

Private fleets are often established by a manufacturer, distributor or a retailer with distribution facilities, and establishes its own fleet of vehicles, as the private fleet, to meet its own transportation needs. Regardless, private fleets often provide transportation services on the open market, especially in their backhaul (return trip) capacity.

In the process of obtaining loads, transportation service providers, such as drivers or others involved in providing transportation services engage one or more services for the purpose of obtaining the load. In addition, other relevant information, such as time estimates may be communicated by the drivers or others involved in providing transportation services is often communicated. While it is possible to configure a request or inquiry for a particular website or service, transportation communications may be such that they are not specifically formatted for the particular website or service, even if the purpose of the communication is to obtain loads.

Major issues with this system are that no one brokerage or service represents a large percentage of loads available or transportation service providers available to accept a given load. Moreover, it is not always practical for a driver to provide brokers and similar services with updates on expected availability in a manner which allows the service to parse the information and convert the information to a form suitable for brokerage services. In many cases, the driver is unable to provide properly formatted data, either because of other activities such as driving, rest stop activities, and engaging in communications related to a present shipment. In other cases, subtle or significant differences between communication interfaces with brokerages or similar services create a barrier to efficiently communicating information concerning availability.

On the other hand, if a brokerage or similar service were to have information indicating that a driver or transportation service provider is available, known as "capacity", it would be possible to offer that driver or transportation service provider brokerage services based on that capacity. At the other side of the equation are the economics of parsing the information received. To the extent that human intervention is reduced, it becomes possible to process a number of available drivers or transportation services (capacity) that is limited by computing capacity rather than personnel. The use of computing still becomes limited by the need to reduce "noise" in the acquired data.

The capacity message may vary from TSP to TSP. There are cases in which the TSP sends a capacity message, but the message is not properly formatted or not in a preferred format used by the brokerage service. This could result from the use of a different format, or could be the result of the TSP being unable to provide properly formatted data. For example, the message may follow the format of a different brokerage service, or not be properly formatted for any given brokerage service. In many cases, such messages would have some or all of the necessary capacity information embedded. The brokerage system may then use machine analysis of the message, and then pass the parsed message for review. The review can be internal, by personnel at the brokerage service, or a message can be sent back to the original sender to confirm that the parsed information is correct. The parsed data is then reviewed, either by reviewers at the brokerage service or by the sender of the capacity message.

A similar problem occurs when a TSP prepares a capacity message suitable for one brokerage service, but also wishes to send substantially the same capacity information to other brokerage services. If the brokerage services require that the capacity information follow formats peculiar to the individual brokerage services, it becomes necessary for the TSP to prepare capacity messages in multiple formats.

It is also possible to monitor communications in order to parse relevant information. Such information takes several forms, including voice and text, as well as location data. A readily accessible form of communication from the standpoint of monitoring is email communication. Email communication is generally in text format, and may contain specific message information relating to availability of transportation services (capacity). Emails may also include attachments, with the attachments including some or all of the relevant information. Capacity emails typically originate with the TSP's dispatcher, and contain specific message information that indicate availability of the capacity. There are also instances in which email contains specific message information that can relate to the plans and status of a driver. The emails can be directly sent for parsing, or could be forwarded, either directly or through a proxy (sometimes called an "email alias").

Email also can be configured so that copies of the email can be selectively transferred for monitoring purposes in a manner that allows the sender to maintain privacy as desired. An issue with monitoring communication is concern with privacy, particularly when the communication being monitored is not directly related to the brokerage itself. If information regarding capacity is harvested from private communications, the driver will desire to have some control over access to that data. Such monitored communication may be isolated from the regular parsing process, so, if the brokerage system is unable to confirm that the message was intended as a capacity message, the brokerage system can request a confirmation from the sender that the relevant information may be used.

One advantage to email, as well as some other forms of communication, is that the email header information or other metadata can be identified with a particular source. This can be used to identify the sending TSP, which can be derived from the email header or other metadata, or based on stored information. Additionally, the IP routing of the email can be used to identify the TSP.

A further aspect of communications is that communications which are not intended to obtain a load may be a useful indicator of the availability of the transportation service provider to provide transportation services (capacity). While general use of such data may be objectionable, if the data harvesting is restricted to a specific purpose and is not expected to be reviewed for content irrelevant to that purpose, the individuals or entities providing this data may find this acceptable. This would be analogous to a room thermostat program monitoring activity for purposes limited to control of the room environment.

In the case of transportation on a bid basis, this is traditionally accomplished by the shipper sending requests for bids to multiple haulers, at least in the case of land based TSPs, who function as venders of transportation services. In some cases, the shipper uses a broker or consolidator, who in turn either requests bids from haulers such as TSPs or other transportation entities or otherwise makes arrangements with haulers. Haulers, on the other hand, seek to obtain shipments in order to maximize their profit. In each case, the ability of the shipper to obtain bids and the ability of the hauler to receive bids is limited to the network and methods they use for sending and receiving bids. In such a case, a shipper and a deadheading hauler may not be aware of each other's availability.

Due to the large volume of requests for shipping quotes, the expected time savings and expected revenue generation, broker services are often used by TSPs. Broker services can use a bid process or can provide shipping rates based on pre-arranged rate schedules. In addition, the broker service accommodates availability of the TSP, so that TSPs are able to use the broker to obtain a load, and the shipping is only arranged for the TSP for times when the TSP is actually available to perform the shipping service.

Time constraints are significant factors for the parties to the shipments. The shipper is interested in meeting a time schedule for when a shipment is picked up, is in-transit and delivered. The TSPs have an interest in being able to closely match the shipper's times, including shipment times for backhaul shipments or other later shipments. The shipper is also time constrained as to work hours and expected time off from work or other obligations.

TSPs, in maximizing profit, must consider the value of a particularly profitable haul in one direction, as offset by possible losses from deadheading (running empty) back. While it is desirable to have each leg generate a profit, it may be that particular shipments in one direction along a shipping lane may be sufficiently profitable to justify either deadheading or taking a loss in the opposite direction. It may be possible to divert the TSP or the TSP's resource in order to increase the return on backhaul trips, but extending the trip time may also result in lost opportunity costs for the more profitable run. In a simplified example, a private fleet may need to balance the need for vehicle availability with the desire for backhaul loads.

Some transportation entities are limited as to geographical area. This can be a matter of preference, or may relate to interstate shipping permits and availability of support facilities. In the case of the TSP being a private fleet carrier, there is often a preference to limit accepted shipments to backhaul shipments returning from in-house shipments. In addition, transportation entities may or may not engage in international cross-border shipping.

The vehicle capabilities also must be considered. This includes the usual distinctions between chassis type, but there is also some opportunity to extend to different markets. As an example, a reefer can haul a non-refrigerated load on the backhaul.

The shipper may have particular requirements for the shipment. In addition to requirements dictated by the type of goods, the shipper may want to check the transportation entity's reputation, may wish to perform a "pre-load check" to verify adequate insurance or an acceptable safety rating, and may have a desire to track the shipment or provide shipment tracking information to the entity receiving the shipment.

Tracking can be achieved by discrete GPS enabled devices, or through the use of a mobile communication device for which location information is available. For most mobile location-based services implemented at the consumer level, this involves reporting GPS positioning; however, a mobile device is also tracked in the mobile network for purposes of establishing a communications handshake with the mobile telecommunications system as part of the mobile device's roaming and basic communication capability (roaming within or outside of the subscriber network). This is sometimes augmented by GPS tracking, but in many cases identifies the mobile device's location by tower and sector. For purposes of tracking the general location of a vehicle, tracking by use of a mobile device requires consent from the mobile customer. The (US) Telecommunications Act, at 47 CFR § 222, including 47 CFR § 222(f), prohibits telecommunication common carriers from accessing location information for purposes other than system operation without consent of the customer. For this reason, a procedure must be established to assure the tracking service that consent from the mobile device user was obtained. Since the driver may want to know the extent to which the tracking information is used prior to giving consent, it is sometimes not possible to determine whether the driver will accept location tracking and if the driver refuses consent, it may not be possible to obtain actual approval for a particular tracking system.

One of the problems in brokered shipments is that the broker will sometimes not have the information regarding the driver's willingness to accept location tracking. This could be a circumstance of limited communication between the broker and the driver or the driver's employer as a TSP or could be something of the nature of the extent of location tracking being unclear. For example, a driver may be willing to accept location tracking of the driver's mobile phone but only if limited to cargo tracking or only if limited to cargo tracking and other functions directly associated with the brokerage.

Shipment tracking is finding increasing use. In addition to providing rough estimates of arrival times, shippers and delivery customers often prefer to have information as to when a shipment is expected to arrive. Taken to another level, shippers prefer to have information relating to the approximate current location of the shipment. In addition to "when will the package arrive" information, current location of the shipment can give the shipper and receiver an idea if the shipment has been delayed or other information related to the shipment. Currently, limited tracking is available for package delivery services, but such information is typically given on a warehouse or depot departure and arrival basis.

In "co-brokered" shipments (one broker sources the TSP and another broker sources the shipper), the broker knows the TSP and also is able to provide this information to the shipper. In some instances, a brokered shipment is "double-brokered" and the broker that sourced the shipper does not necessarily know who the TSP is. Consequently, in "double brokered" shipments, the shipper typically does not know who the TSP is. This is considered undesirable by many shippers, and so the shipper may wish to exclude "double-brokered" bidders if the identity of the TSP is not known to the shipper. In many cases, double brokering is considered a violation of U.S. law (49 USC § 14916), which imposes an additional legal requirement for identifying the TSP to the shipper.

"Co-brokering" also involves a shipment agreed to by one broker being fulfilled by a second broker, in which case, the second broker would normally be given the identity of the TSP.

A reverse auction is a type of auction in which the roles of buyer and seller are reversed. In an ordinary auction (also known as a forward auction), buyers compete to obtain a good or service by offering increasingly higher prices. In the case of a performance bid, such as a response to a Request for Quote (RFQ) or Request for Price (RFP), the bidding does not follow the ordinary auction format. In the case of bidding by TSPs, the TSP is the bidder, whereas the shipper selects and accepts a bid. This becomes a "reverse auction" when one or more TSPs are invited to meet actual or estimated bids, because the TSP is being asked to bid a quoted amount lower than the lowest bidder.

SUMMARY

Capacity to provide transportation services is matched with a specified demand for transportation services in accordance with capabilities and business practices of a transportation service provider providing the transportation services. Communication, such as email or another form of parsable communication, is received from a transportation service provider for consideration as having information indicating capacity data indicating availability of the transportation service provider to provide transportation services. The communication is parsed for the capacity data, and the capacity data is formatted to a preferred data format. The capacity data, formatted to the preferred data format is stored. The stored capacity data is reviewed to determine if the stored capacity data accurately reflects capacity indicated by the received communication.

Machine learning is used to automatically determine patterns of the parsed data so as to associate subsequently-received data with the stored formats. A demand for transportation services is automatically matched with the capacity to provide transportation services. Machine learning is used to automatically determine preference criteria and add to the retrieved preference data for filtering and ranking as inferred positive and negative preferences. Machine learning may also be used to determine a pattern of behavior to predict future capacity.

The parsing and formatting comprises identifying one or more features of capacity data and comparing the parsed communication to a plurality of stored formats for capacity data and associations of the data with a desired format. In the case of the parsed communication matching a format of one of the stored formats for capacity data, the data is associated with that stored format and is retrieved from the communication based on the association. In the case of the parsed communication not matching a format of one of the stored formats for capacity data, but substantially corresponding to that format, the data is extracted or reformatted and then associated with that stored format and retrieved from the communication based on an association of the extracted or reformatted data with that stored format.

BRIEF DESCRIPTION OF THE DRAWINGS

FIG. 7A shows an overview of the process.

FIG. 7B shows a search and bidding process. FIG. 7C shows driver data gathering. FIG. 7D shows load and driver confirmation.

DETAILED DESCRIPTION

Overview

Figure 1:
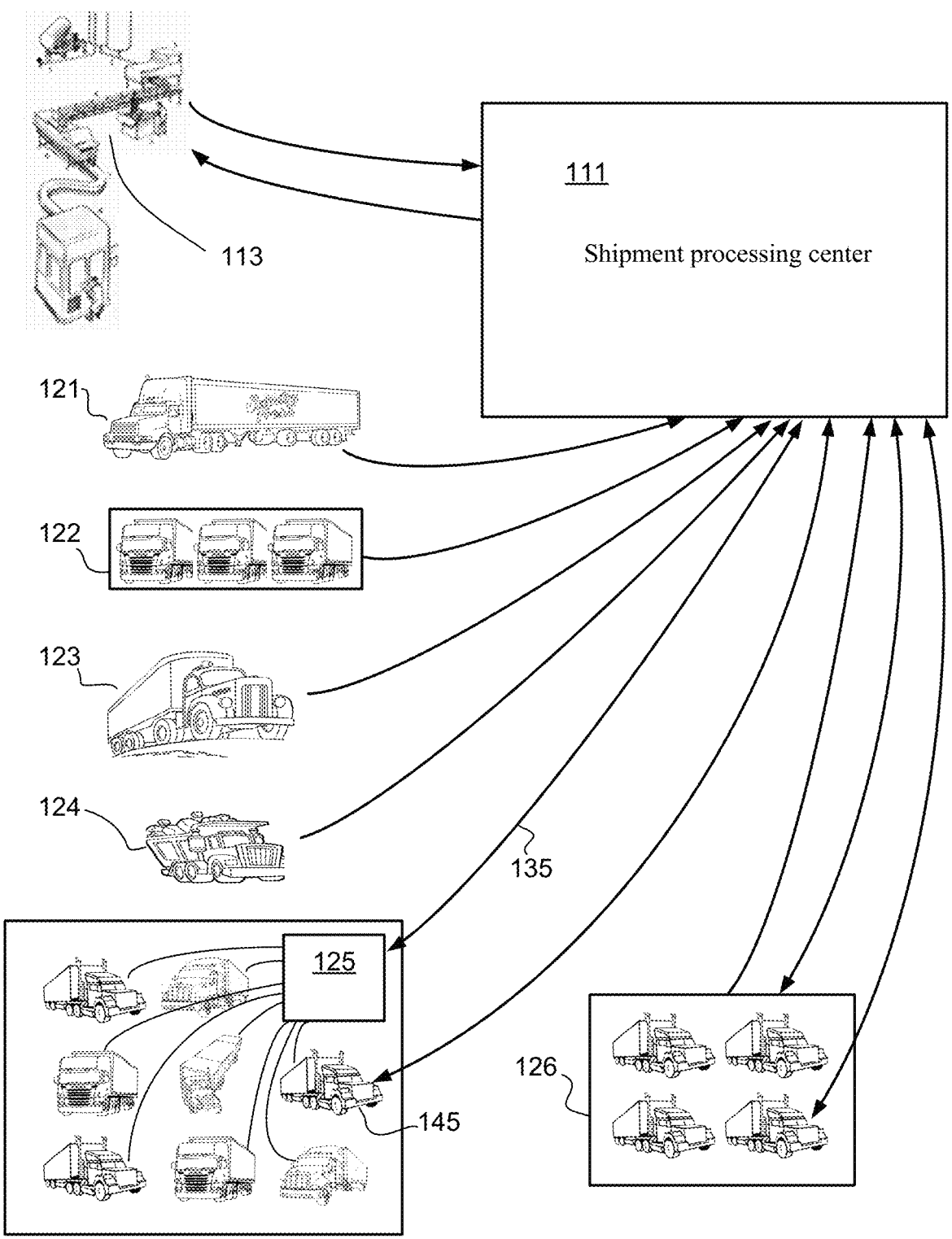
FIG. 1 is a schematic diagram showing the system's interaction with interested parties.

In the case of a backhaul or next leg, the interest of the TSP in participating is one of "find me a load". The intent is to find the driver a load for the backhaul or next leg, as opposed to obtain transportation services for the shipment. In a "find me a load" application, the focus is on the driver; however, this is not intended as a limitation, and it is possible that some factors may also apply to a TSP. For ease of description, the "find me a load" functions will be described in terms of obtaining a load or other transportation service for a driver with the understanding that this could apply to other entities such as specialized vehicles in a fleet. The bidding system itself is set up with the focus of finding a driver for the shipper. In order for a "find me a load" application to be effective within a bidding system, it becomes necessary to adapt the "find me a load" function to the bidding system without compromising the bidding system itself.

An automated system is configured to list and accept bids for transportation services. In doing so, bids are taken directly from Transportation Service Providers (TSPs), from brokers and other intermediaries who in turn seek bids from TSPs or otherwise obtain bids from TSPs and other sources. In addition, the bids can be used for bid estimation, in which participating TSPs may be given an opportunity to engage in a "reverse auction" bid in order to fill a need for obtaining a transportation order. The system can receive bids in email, web, SMS, interactive voice response (IVR), telephone communications not using IVR and other suitable interfaces.

Non-limiting examples of transportation services are shipments of loads and related trucking services. Transportation services can include moving passengers, taxi, car services, and so-called "ride sharing" services in which a central business arranges rides for fares, in which case the load can be a passenger or packages. In each of these cases, the transportation service has at least one origin or destination. While "shipper," "consignor," "consignee," "load," "hauler" and "shipment" are described in connection with transportation services, the descriptions are given by way of non-limiting examples. Transportation services also includes providing transportation for items other than loads, so that the "shipper" and "load" may be a passenger or other entity submitting the transportation request, and a "shipment" may be the passenger's trip provided as a transportation service.

In many cases, TSPs use "shipping lanes", which are origin-destination (consignor-consignee) pairs, generally identified by the general geographical areas of the origin and destination rather than the specific location of the origin or destination. Nevertheless, the "shipping lane" may vary in its specificity, depending on a number of factors. For example, if a long distance haul is performed, the TSP may be willing to extend the definition of the shipping lane to cover larger geographic areas for the origin and destination in order to have an easier time to find a return (backhaul) load. To use a specific non-limiting example, if a TSP is providing services between New York and San Francisco, an origin or destination in Philadelphia may be within the scope of the shipping lane, but over a shorter distance, Philadelphia may be a significant diversion from a shipping lane whose terminus is New York.

A "backhaul" is a return leg in a simple two leg departure-and-return trip. Some trips include more than two legs, in which case a "next leg" or "subsequent leg" generally connects a series of legs back to the origin. Such trips with more than one "backhaul" leg can be more profitable, in that there is often an imbalance of transportation needs in both directions of a shipping lane, but are more complicated to arrange because they involve additional arrangements for transportation services and because it is not always apparent how to optimize transportation services bookings. In origin and destination (consignor and consignee) oriented transportation services, it is anticipated that an initial trip will have a subsequent leg. In the case of a simple two-way trip, the single subsequent leg or next leg is a "backhaul". A "deadhead" leg is a leg without a load, but also describes the connection between different termini while empty or not delivering a load.

For purposes of this description, a "round trip" is intended to describe a forward haul in combination with subsequent hauls until the driver returns to a home base. In the case of a forward haul and a backhaul, the "round trip" would be these two legs; however in the case of multiple legs, the "round trip" would include each leg. It is understood, however, that in some cases, a driver will extend the trip through several legs until attempting to return to a home base.

"Capacity" as used herein means the availability to provide a transportation service. In the case of brokering loads for trucking, "capacity" means space or haulage availability, in which a TSP is able to accept shipments for delivery. For example, if a TSP has a truck with a load being delivered to San Francisco, but needs to return to Dallas on a backhaul and has no load booked, the TSP has capacity on a run from San Francisco to Dallas for the backhaul.

The TSP or driver can directly provide the information concerning capacity in the form of availability for a backhaul or next load, for example using a website. Additionally, if a computer program is given access to driver communications, the information from the communications can be used to determine a "next load" availability for the driver. Examples of communications include, but are not limited to:
  email;
  SMS text messages;
  voice messages and voice communications; and
  internet activity by the driver, for example posts on social media or group website postings.

The information in these messages are then parsed to determine if they contain information related to "next load" availability. In addition, if a program is able to link driver location information, for example cell phone location, with the parsed information from communications, the location can be used to augment the parsed information.

Further information related to initial driver plans, when available, is used in combination with the parsed information from messages and location data. The initial driver plans provide four functions:

1. The initial data allows the driver to provide a simple input of data which can be used as a baseline to determine a prior destination (location of the driver for the next load), and initial time estimate. This allows parsed communications to be used to modify the initial data rather than attempt to make a determination of the anticipated location where the driver will be available.
2. The initial data provides an indication of whether the driver expects to be available for accepting a load.
3. The initial data can be used to obtain consent to parse the communications and can be used to initiate monitoring communications.
4. The collection of initial data can give the driver an opportunity to provide manual inputs, such as a desired backhaul or "next leg" destination, desired layover times at the initial destination and time in service requirements that may not be available from monitoring the driver.

Parsing Received Emails

Communications received from TSPs can take several forms, including, by way of non-limiting example:

Direct communication which is provided according to a format used by the brokerage service or related service;

Direct communications which have data useful for executing a bid, but which are not provided according to a format used by the brokerage service or related service; and Indirect or automatically monitored communication provided for other purposes, in which the automatic monitoring allows information regarding capacity of the TSP to be parsed through the automatically monitoring. The indirect or automatic monitoring allows the brokerage service or related service to monitor "chatter" to determine if the TSP has capacity for providing transportation services (e.g., hauling loads).

Direct communication is communication intended specifically to be received by the recipient. This can be in the form of an, email, SMS, web form or other technique in which the brokerage or similar service is either the primary recipient or one of the intended recipients of the message. In an email, a typical direct communication would have an address specified for the purpose of communicating transportation service capacity in the "to:" header, although the "cc:" or "bcc:" headers can also be used to achieve direct communication.

In the case of direct communication provided according to a format used by the brokerage service or related service, this may be input in its existing form, either manually or automatically. The data itself is already in its desired format, and so it is used as-is or combined with qualifying data as will be described below. A primary issue is that, unless the TSP is specifically focused on a particular brokerage service, the TSP will not necessarily use the preferred format. This is further complicated by the fact that the TSP will often format the data for multiple services, with varying data structures, and sometimes in a format intended for human reading.

When a direct communication is received, it is automatically reviewed to determine if it is in a suitable format for entry into a "capacity" database, with only rote manipulation. If the data is not in a suitable format, then the message data is parsed to associate the data with suitable fields. A portion of the data necessary to fill in the fields is used to populate the fields, and data that is not necessary for population of the fields is not used. The full message may be retained for later confirmation analysis, but if the data used to populate the fields is adequate, then the full message is not reviewed. One exception is data which is identified as "comment" or with any other common identifier to indicate that additional information is contained in the message, which would be forwarded for review.

If the received communication is in a format which requires analysis for entry of data into the database, then the communication is analyzed in order to parse the required data. The data is then entered into the database. If the parsing of the data results in ambiguities, then the data is reviewed either by the receiving service or a communication, with the data as initially parsed, is sent back to the original sender (e.g., TSP) for review. Human reviews can optionally be called in order to ensure the data from the email is applied to the database correctly. This achieves most of the work involved in placing the data in a suitable format, so the original sender can remove any errors and then reply with a direct communication.

If the email is not specifically configured for a particular system, the email is parsed to determine which format it uses in terms of:

text structure format; i.e., plain text, formatted text, attachment; text plus attachment, etc. data structure format; i.e., how the data is arranged, and whether the data arrangement can be associated with a known data arrangement format.

By parsing the email, an attempt is made to render the data contained in the email in a format suitable for the inclusion of the capacity in a database listing capacity. In some cases, the data may be defective and not parsable by the primary target recipient, e.g., a word processing document sent to a service that uses plain text submissions. Regardless, the data is still embedded in the email and since the system can parse the data, it is able to use the data, even with the target recipient who could not parse the original email. This may be accidental on the part of the sender, or could be intentional. Provided the system can parse the format sufficiently to identify the suitable fields, the data can be stored in a preferred format and transmitted as desired for purposes of aggregating the offer of capacity.

Given that the system can parse the email, the sender can still send the mis-formatted data with the expectation that the system will pick up the email and broker the load. Thus the ability to parse the email and identify a data format allows a TSP to select a preferred format for offering capacity, and allow the system to parse the data. This allows the brokerage system to apply more strict criteria for data in its preferred format, and yet still be able to accept data that does not conform to the specifications of its format—data received that does not conform to the specifications is merely repaired to place it into specification.

In any case, a response may be sent to the sender as an acknowledgement, and to the extent possible, thanking the sender.

Interpretive Harvesting as a Service

Interpretive harvesting is used to extract data from driver communications such as email which may indicate capacity. This data is used in two manners:

1. Determining if the driver has capacity, and, if so, estimating time of availability; and
2. Using the parsed information from the email in order to convert the information to a format for bidding on the load.

Advantageously, the parsing of the driver communications is performed by (computer) machine processing. Initial human intervention would be performed by the driver, who is able to make corrections and authorize transfer of the parsed data for its intended purposes. This provides assurance to the driver that the data parsed by the system is used for the desired purposes. This also provides the driver with information concerning the nature of data being collected, and that the data is being collected for a purpose that is in accord with the wishes of the driver.

It is possible to presume acceptance of the use of the data without express authorization, by providing an email or other communication address for the purpose. This allows the driver to use a free form format for requesting loads. Since such communications are specifically intended to solicit a load, if the information is complete, the submission can be entered without further authorization by the driver.

The information is combined with location information from the driver's communication device or from an external source. This allows the information parsed from the message to be associated with the location information, which can be used to refine the information available from the parsed data obtained from the communication. Non-limiting examples of refinement include clarification of location of availability, and estimates of time of availability.

If information from a driver's electronic logbook or from a vehicle electronic logbook is available, this data can also be assimilated into the parsed information. By way of non-limiting example, such information may be used for adjusting time of availability based on maximum hours of work. An example of maximum hours of work is the Hours of Service (HOS) Regulations of the US Department of Transportation, Federal Motor Carrier Safety Administration. Other information, such as fueling data, battery recharge data and data related to the specific timing of rest stops may also be available from the electronic logbook data. The electronic logbook information may be directly transmitted, or may be relayed through an Electronic Logging Device (ELD) or an Application Data Interface (API) on a portable communication device.

Interaction with Interested Parties

FIG. 1 is a schematic diagram showing the system's interaction with interested parties. The program acts as a system or shipment processing center 111 to receive requests for transportation services, obtain bids from TSPs and engage one or more of the TSPs to provide the transportation services. The shipper or customer 113 provides to the shipment processing center 111 a request, which identifies the transportation service as will be described infra. The central processing center 111 then broadcasts requests for bids. In response, TSPs 121-124, other bid consolidation entities 125 and centrally managed fleets 126 such as private fleets and fleets, will respond to the request with a bid as bidding entities. In addition, the shipment processing center 111 engages other entities which obtain bids from TSPs, such as bid consolidation entity 125. Bid consolidation entities comprise various types of entities that obtain bids, such as, by way of non-limiting examples, load boards, bid consolidators, brokers and partner businesses who also obtain bids or who identify available TSPs. The bids are received from the bidding entities 121-126. Some of these bid consolidation entities 125 require queries to be provided in a particular data format, and so the shipment processing center 111 parses the request for transportation services in order to conform to the format used by individual bid consolidation entities 125, as represented by double arrow 135. Prices are calculated by the shipment processing center, and prices, corresponding to bids plus margin, or potentially commission, are quoted to the customer 113.

After acceptance by the customer or in the case of automatic acceptance in accordance with customer criteria, when a time limit for receiving bids has been reached, the shipment processing center 111 communicates its offer to the customer 113 and after the customer agrees to the shipment processing center's 111 offer, the shipment processing center 111 communicates acceptance of a bid and requests confirmation from the TSP. In the case of bid consolidation entities 125, the confirmation may be directly with the individual TSP 145 represented by the bid consolidation entity 125 or through the bid consolidation entity. Similarly, acceptance and confirmation may be obtained through a centrally managed fleet 126 or multi-vehicle TSP 122 rather than through an individual driver. Finally, additional communication, such as a request for acceptance of location tracking, is made with the individual driver.

The selection of the bid could be made by the customer 113 or could be made by the shipment processing center 111 on the basis of criteria provided by the customer.

While one TSP is described as providing the transportation service, it is anticipated that some loads will involve plural shipments. These plural shipments may be performed by one TSP or may be performed by multiple TSPs. In the event that the shipment or other transportation service may be split between multiple TSPs, the system will either permit bidding for portions of the shipment or may post bids for multiple shipments.

In obtaining shipping services, a request for shipment is received. The request includes physical characteristics of the load as relevant to shipping, origin and destination information, time constraints, and other requirements and preferences of the shipper. The physical characteristics of the load include a number of factors which may be relevant to the particular load. For example, full truckload cargos of a particular commodity may not need to identify weight (except for regulatory purposes). On the other hand, some cargos need to be transported with suitable equipment, so some food items may need to be transported by reefer, whereas the reefer may be used for some non-refrigerated goods on a backhaul (or forward haul) or a different leg. Similar restrictions apply to different loads with similar equipment, so for example, a milk tanker could be used to ship diesel fuel on the backhaul, but one would not want to ship milk in that tanker in a subsequent run.

In hauling loads, the TSP is likely to want to limit deadheading. Typically, the TSP will attempt to set up a route with a forward leg and a backhaul in one shipping lane, in which both legs involve a load. In some cases, the trip may involve multiple legs, particularly if a particular leg does not typically have strong demand. While it is possible to remain profitable even if one leg, when taken in isolation, is a loss, the TSP will seek overall profitability, and in doing so may accept an unprofitable leg provided acceptance of that less profitable load results in less of a loss than deadheading.

Each of these legs is intended to allow for not exceeding the maximum time that the driver is on the road or that the driver can drive, and other legal restrictions. The legs are further intended to meet other driver and equipment scheduling requirements and any restrictions imposed by the operator or regulations. Additional considerations include necessary turn-around time for the driver at sequential destinations and origins. These turn-around times are dependent on the physical capabilities and local distances between depots, but also depend on the driver's habits and the time and effort of loading and unloading of the cargo.

There are several items that the shipper may either desire or require. These items include the TSP meeting legal requirement such as DOT authority, authority to engage in international shipments and endorsements such as hazmat, tanker and double/triple endorsements, and insurance coverage, and acceptable safety record.

The matching of bids for transportation services with users of transportation services can comprise accepting bids for moving cargo by TSPs for shipments or accepting bids for transporting passengers, as well as other transportation services operating on an "origin/destination" model. The matching of bids can be performed by a method which is initiated by a received transportation request. The request comprises, as necessary, a description of a load or other transportation service, and may, by way of non-limiting examples, comprise:

a generic description of the load,
freight class,
origin location of the load,
destination,
time of availability of the load,
timing requirements for pick-up and delivery,
a requirement for intermediate stops or multiple pickups or deliveries,
weight, physical dimensions or other relevant attributes of the load,
material or product description (if not part of the generic description of the load),
special requirements for the load, such as temperature control (refrigeration or climate control requirements), special handling, etc.,
shipping containers provided,
other physical requirements or characteristic of the load, type and purpose of transport vehicle,
acceptability of multimodal transport or other transport requiring more than one TSP or allowing the use of multiple legs,
times of availability at origin and destination, including terminal hours of operation,
regulatory compliance and requirements,
insurance required by the shipper,
value of load,
TSPs that should be avoided and cannot be used.
required qualifications of the TSP,
other data required by an entity providing the transportation request concerning the transportation request
safety-related data, including data relating to maintaining proper tire pressure.

The actual details of the description can vary. For example, 40,000 liters of crude oil need not describe many details unless special equipment such as heating equipment is required. Similarly, a standard intermodal cargo van is fairly described by the class or size of cargo van, along with any special requirements such as hazmat requirements.

In addition to the standard descriptions required for engaging TSPs, additional descriptions can be included. For example, if location tracking of the shipment is desired, the description of the load or other transportation service can include a description of requirements for location tracking.

Using the origin and destination information, a shipping lane is determined, characterizing the transportation request. In some cases, the shipping lane is determined by other characteristics of the load, and these characteristics are taken into consideration when determining the shipping lane. By way of non-limiting example, less than truckload (LTL) shipments may be characterized differently from full load shipments for purposes of determining the shipping lane.

The transportation request is parsed by extracting data in order to obtain criteria needed to fulfill the transportation request. If done correctly, the criteria for the transportation request will be an accurate description of the desired transportation service and the transportation lane. The criteria are then distributed as a request for bids.

There are some bids that are available through third-party bidding or brokerage systems, which may also be automated. Such third-party bidding may be, by way of non-limiting examples, load boards, bid consolidators, and partner businesses who also obtain bids or who identify available TSPs. Since the third party software may have a different format from that of the disclosed system, the parsed data is matched to the required format for each third party system and is submitted. The bids are received thru email, directly into the system (e.g., via web interface), phone, mobile SMS, IVR and other suitable interfaces.

Direct bids and bids from third party bidding or brokerage systems are received and evaluated. One or more bids are selected according to predetermined criteria, which may comprise lowest price, category of TSP, scheduling, reputation, relationship, third-party intermediate stops and shared cargo space, and willingness to accept location tracking. Since bids are obtained from third party bidding, the disclosed technique creates a "network of networks" by which a shipper or other entity submitting the transportation request can obtain transportation services on a competitive bid basis by using a single contact. Non-limiting examples of third party bidding would be bidding by brokerages, consolidators and other intermediaries. In that way, instead of reviewing separate listings of bid response data from multiple sources, the shipper is able to review prices quoted for all bids in a single action, with desired options presented. The transportation service bids are thereby received from at least one of the respondents, and stored as an aggregated bid database. As a single list, the bids can be arranged in order by category. Some of these categories include options, such as the willingness to accept location tracking or direct shipment from origin to destination without intermediate stops.

For purposes of location tracking, a distinction is made between the driver and other business entities. In many cases, the authority to accept location tracking is with the driver who is generally the subscriber to the mobile device service. If the subscriber of a mobile device used for location tracking is presumed to be the individual, the individual driver would be asked to provide final authorization for location tracking.

The bids are then converted to prices, which are computed based on a commission or a margin that may vary or fee for the service of obtaining and following through with the bids. In many cases, this is a fixed price, but prices may vary in accordance with business need. These prices are provided to the shipper, including information regarding included options as a part of individual bids by using one or more computing devices to calculate a bid commission or margin for applying to render the prices corresponding to the bids. As described here, the "bid" is the amount the TSP or TSP's representative quotes for the transportation service. The "price" is the amount the shipper pays. The difference between the "bid" and the "price" is the margin.

The prices are quoted to the shipper in an ordered format. The quotes can be arranged according to an order desired by the shipper, such as by price order, by listing according to option, by reputation of the TSP or by estimated time for delivery. The shipper then selects a price quote. Alternatively, the shipper may select a priority of criteria by which the TSP is selected, which may be, by way of non-limiting examples:

price, if delivered within a specified time period,
price, if delivered within a specified time period but only if the price does not exceed the median of all prices, and unconfirmed availability of location tracking, but only if within 10% of minimum quoted price.

If the shipper first selects a priority of criteria by which the TSP is selected, and then elects automatic selection, the TSP is selected according to the criteria. One of the advantages of pre-established criteria is that the shipper need not evaluate bids, but rather establish criteria for the bids and await further information regarding the transportation services.

Since there can be a time lag between submission of the bid and the acceptance of the price, there is a possibility that the TSP is no longer available upon acceptance. Therefore, upon acceptance, the selected price is matched to the bid and the TSP is asked to confirm the acceptance as a confirmed bid. This becomes an agreement to provide services.

If the bid included acceptance of location tracking services, it is still desired to obtain confirmation of acceptance of tracking from the holder of the mobile communication device to be used for tracking. This could be achieved by identifying the mobile number used by the driver. A text message could be sent to the driver asking for confirmation of acceptance of mobile device tracking for the purpose of tracking the delivery. If the driver replies with an acceptance, then that is considered to be an "opt-in" confirmation of acceptance of tracking. Additionally, this confirmation can be established through the driver calling an interactive voice response (IVR) system or another entity.

The text message may be configured to further obtain permission to use the tracking information to offer loads for a backhaul or "next leg" shipment. That serves two purposes:

1. It obtains consent to the use of the location information for a further purpose, that is marketing of further brokerage services for the "next leg"; and
2. It determines if and when the TSP or driver is available for "next leg" transportation services.

It is possible that unexpected circumstances could occur resulting in delay of the driver to an extent that would result in the "next leg" shipment needing to be reassigned. This delay would appear as part of the tracking of the shipment. As a result, the shipment may be assigned to another TSP and the initial TSP being cancelled for the next load. In such a case, the shipment processing center can use the information to reschedule the driver and find a different resource to service the initial next leg shipment. Permission to use the location data for this purpose ("next leg" scheduling) can be part of the original consent to use location services, or the system can call or text, to obtain permission to use the location data to reschedule the driver. In either case, the driver or TSP is made aware of the availability for rescheduling services.

Figure 2:
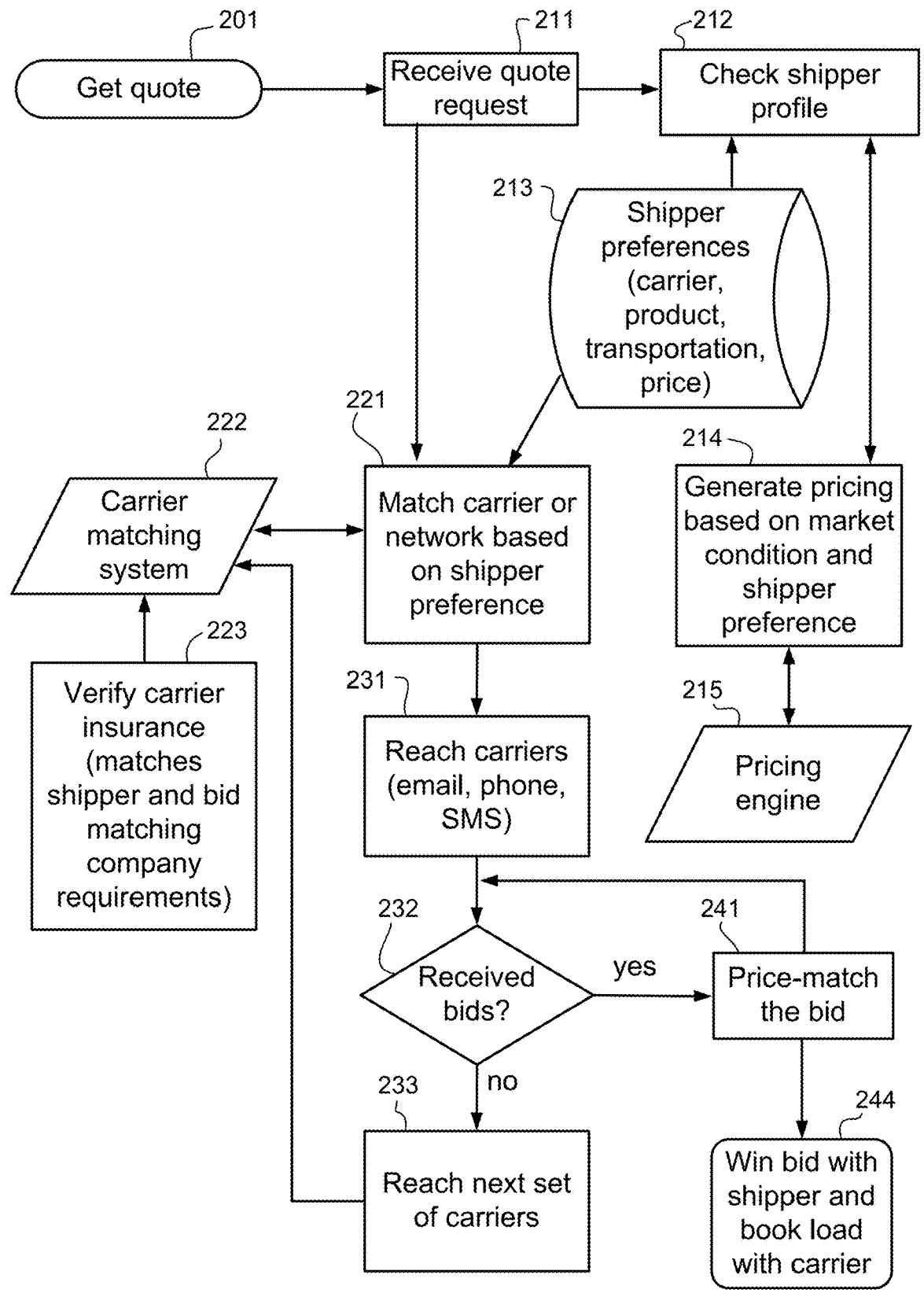
FIG. 2 is a flow diagram showing the operation of the system.

FIG. 2 is a schematic diagram showing the system's interaction with interested parties. The process starts with a request to obtain a quote for transportation services (step 201), which may be received from a shipper or other interested party. The quote is received (step 211), and when received, the shipper's profile is checked (step 212), including potentially checking shipper preferences, volume, commitment, financial health, payment history and requirements (step 213). Pricing is estimated based on market condition and shipper preferences or pricing is determined by instantly receiving costing information and applying a margin (step 214), with pricing factors generated by use of a pricing engine (step 215) which can estimate market pricing and uses shipper preferences and attributes to provide pricing estimates according to market conditions and the shipping requirements as specified by the shipper, which are accessed from a shipper database (step 213).

The step of estimating pricing (step 214) provides an estimate of cost. It is common for brokers to estimate their costs using various sources of data, and provide a price during the bidding phase, and once the shipper has accepted this submitted price, the brokerage will then secure transportation resources. The brokerage expects that these transportation resources will be provided at the expected cost or below. The estimated pricing can be used for some types of shipments, for example LTL shipments. In such a case, it is possible to estimate instant costing. It is then possible to apply a margin and then generate a price within a short time period. For non-LTL (normal) shipments, a cost and price can be quickly estimated (steps 214 and 215), and once the shipper accepts, the capacity is sourced. For non-LTL "covered pricing only" the system seeks out the carrier first, and once a cost is obtained from the carrier, a price is presented for the shipper to accept or reject.

TSPs, including TSPs represented by other networks are matched to the shipper based on preference, service areas and profile metrics of the aggregating carrier and of the TSPs from that aggregating carrier or the TSPs directly and bids are solicited (step 221). This may include providing a carrier matching system (step 222), and may further include matching further requirements such as verification of insurance coverage by the carrier for insurable losses involving the cargo (step 223) and protection from lawsuits resulting from TSP involved accidents. Upon identifying TSPs and networks of TSPs that are acceptable, the system reaches to the TSPs and networks of TSPs to obtain bids for a specific scope of transportation work (step 231). A determination is made if bids are received (step 232), and if not, the system repeats the search for matching TSPs (step 221).

If bids are received, one or more bids have their costs then marked up to generate associated pricing, to provide prices corresponding to the bids (step 241). By way of non-limiting example, the prices correspond to the bids according to a price-plus-margin calculation; however, if additional services, such as location tracking, are rendered, the corresponding price may be adjusted accordingly. The sequence of determining if bids are received (step 232), followed by providing prices corresponding to the bids (step 241) may be repeated multiple times in order to render a good price match. The system or the entity requesting the quote for transportation services selects a bid with its associated pricing and then the system awards the bid and its cost to the TSP (step 244).

The automated check conveniently provides a "network of networks" in that the shipper or entity requesting transportation services is able to obtain prices for transporting loads or other transportation services from a single service which obtains bids from different sources and aggregators of different sources. On receipt of a request from a shipper, requests for bids are sent to carriers, directly and indirectly and, if available, additionally one or more on-line networks are automatically queried for bids. These steps are initiated with the bidding process (step 201 in FIG. 2).

The bidding process initially comprises setting up the bid invitation on an on-line database via email, web, SMS, fax or other suitable interface. The bid invitation includes the specifications for the bid, such as full load, weight, commodity, dimensional requirements, and special cargo requirements. Generally loads are bid for carriage on the TSP's equipment; however, this can include intermodal carrier chassis and can specify "power only" for trailers in the possession of the shipper.

Further specifications can be either mandatory or optional. A non-limiting example of an optional specification would be the acceptance of location tracking. If a shipper wishes to have location tracking, but is willing to accept non-tracked transportation, the bid would indicate whether the TSP has agreed to location tracking. In some cases, the entity entering the bid (e.g., a broker) will not be able to guarantee that the TSP will accept location tracking, in which case, the bid can, by non-limiting example, be set to indicate "unknown".

The check on whether the double-brokered bid would be a violation of law has obvious implications, but also allows the system to seek bids from brokers who would otherwise have concerns about responding to another broker, because assurance would be available that an illegal bid would not be accepted. One of the advantages of automating the check to include double-brokered bids is that the automated system can enforce compliance of carrier disclosure laws and regulations, while at the same time assuring the broker involved in the original bid retains the brokering or bidding relationship with the TSP. This also makes it easier to obtain information for location tracking such as the identification (phone number) of a mobile communication device used by the driver, as well as the proper consent for location tracking and for direct follow up with that TSP.

Multimodal Movement

As the term implies, multimodal movement exists where and when a load is transported across multiple transportation modes. The most familiar form of this is intermodal freight transport using intermodal containers or ISO containers, sometimes referred to as shipping containers. These containers are designed to be transported by ships or barges, by rail and by truck. In the case of truck transport, ISO containers are typically carried on specialized trailers or semi-trailers, called "frames". Other multimodal systems include "piggyback" trailers, which use full semi-trailers intended for carriage on specialized railcars. In addition, various forms of cargo are often transported using multimodal systems, such as is implemented by package express companies using a mixture of local delivery trucks, semi-trailers for inter-city transport, and/or air transport. Other forms include, by way of non-limiting example, containerized shipping using various configurations of containers.

When implemented according to the disclosed techniques, the multimodal operation can be through a single provider, or can be separately provided by different TSPs. This allows TSPs who do not have combined transportation service or the full desired service area, to make arrangements with other carriers in multimodal transportation to bid for a segment of the multimodal leg, while allowing further arrangements to be made by the disclosed system.

It is anticipated that, in some cases, one or more modes in a multimodal shipment will be used at fixed rates, so that no bid is required for that mode. Such an arrangement expedites the operation of the bid and pricing system by reducing the total number of segments which must be bid. When multimodal bids are included, the shipper may receive a bid that is door to door service or may receive the quoted prices for the multimodal bid, along with non-multimodal bids if the shipper elects to receive both types of bids.

Similar arrangements can be accomplished with people arranging for transportation as a passenger. By way of non-limiting example, instead of separately arranging individual connections to reach a destination, a person (or persons) can request transportation using the disclosed techniques. While a single mode, such as a car or shared van can be used for the entire trip, the passenger can be offered local service to connect with a train, plane or inter-city bus, and further including local service to the destination. In a functional aspect, this allows someone to arrange for "door to door" service. For example, someone going to or from an airport may be able to use bus service configured for the purpose, but without the need to separately arrange for and separately schedule different services.

Next Leg Bids

Next leg or backhaul bids add the factors that the TSP must either obtain a load or deadhead. In the case of the TSP or driver wishing to return to home base or another specified location, this also places a constraint on both origin and final destination.

In some cases, the TSP has already made arrangements for one leg (typically the front haul) but needs to use a bidding process or negotiate for the other leg or legs. This is often the case with private fleet carriers, but also applies to other situations, such as TSPs making a delivery for an important client on a headhaul, or a TSP with long term contracts and outsourced private fleets. In these cases, there is one leg which is essentially fixed, but the TSP can be flexible for other legs within the time constraints of the pre-existing arrangements. The ability to provide multiple legs can even extend to non-economic matters such as the desire of a driver to pass through a particular location perhaps with specific timing.

Most of the time, a TSP will bid on a single leg, the front haul or a backhaul, regardless of pre-existing arrangements or contracts. Occasionally, a TSP will bid on a round trip or for multiple legs.

The system is capable of using its data to provide information to the TSP relevant to selection of optimum routing in terms of estimated revenue cost and profit, and in terms of market demand. This may be done by offering to provide information to the TSP concerning optimization of shipping lane selection. If the TSP accepts the offer of the optimization information, historic or estimated transportation service data is compared with historic and current data concerning optimization of shipping lane selection, and the TSP is provided with revenue, cost and profit estimation for operation along different shipping lanes. By way of non-limiting example, the optimization data may be obtained by using one of publically available databases, and historic data obtained for a plurality of lanes corresponding to at least one origin or destination of the TSP. The comparison with revenue, cost and profit estimation is used to generate information indicating at least one of an optimum shipping lane and an optimum time of operation of the transportation service provider. The information concerning the optimum shipping lane and/or optimum time or operation is provided to the TSP, who can use the information to select a different shipping lane based on the origin or destination. Alternatively, the information concerning the optimum shipping lane and/or optimum time can be used to invite the TSP to submit bids corresponding to the optimum shipping lane and/or optimum time or operation. The information can provide the TSP with general estimates of revenue, cost and profit.

By way of non-limiting example, such use of data may be achieved through calculations of optimum routing obtained by the use of one or more computing devices.

For a "next leg" trip, the system relies on a predictive analytics system, in which factors related to demand for transportation services are calculated based on historical and present data. The predictive analytics system accumulates data regarding historic and current bids, and, based on this data, has a capability of guiding the TSP as to which lane(s) and even which load(s) to take to maximize any of revenue, gross margin or even operating margin. In addition to the bid and ask on the next leg, the system takes into account or considers the following dynamic inputs when providing this guidance:

Market demand for that lane,
Market supply for that lane,
Carrier cost data, variable and fixed,
Current weather, weather forecast,
Road conditions,
Equipment,
Loading and unloading times, and
Regulatory requirements.

Transportation requests are matched to shipping resources and the TSP is matched to the transportation request. At this point, it is possible to request bids from the TSP for the shipping lane. Alternatively, since the market for the shipping lane is already known, the system can make a bid offer to the TSP and enter that bid. The system can also enter a price for customers, based on the market for transportation services, so that the customer can receive a price equivalent to an anticipated low bid and the TSP can be assured a load. Advantages of using calculated market prices are that the TSP can ignore the bidding process and await information regarding an assigned leg. A further advantage is that calculated market rates avoid the possibility of shill bidding intended to artificially drive down prices for a particular shipping lane.

Since the disclosed system is able to determine times for the scheduled trip, these times can be used as a basis for a "next leg". Time estimates related to loading and unloading, as well as other layover times can be added. To this, additional time to deadhead from one destination to a next leg origin is added. In addition, regulatory requirements for rest time and maximum work hours per time period can be calculated, so that an accurate estimate can be made regarding pick-up and delivery. These times are adjusted to accommodate available hours of pick-up and delivery. Since the TSP is likely to want to select a location for mandated breaks, the availability of the scheduling information facilitates planning.

The TSP can also input additional time for things such as desired break time between loads at a given location, maintenance and meals, as well as providing "breathing room" to reduce time pressure to meet schedules.

It is possible that unexpected circumstances could occur resulting in delay of the driver to an extent that would result in the "next leg" shipment being reassigned. This delay would appear as part of the tracking of the shipment. In such a case, the shipment processing center can use the information to reschedule the driver. Permission to use the location data for this purpose ("next leg" scheduling) can be part of the original consent to use location services, or the system can call to obtain permission to use the location data to reschedule the driver. In either case, the driver or TSP is made aware of the availability of rescheduling services.

The system further determines if the TSP associated with the accepted bid will accept a further transportation request for a backhaul or additional leg, and if so, the system proceeds to make the determination based on an estimated time of availability. If the TSP accepts, a determination is made of a suitable shipping lane. The suitable shipping lane may be defined by the TSP, such as "direct return backhaul requested" or can be calculated based on a number of factors. The factors can comprise, by way of non-limiting examples:
  permissible deviation from a direct backhaul;
  time allowed by the TSP before returning to the home base;
  demand for transportation services to the home base from intermediate destinations, as determined by historic or current data;
  market demand for transportation along different shipping lanes,
  regulatory constraints; and
  destinations requested by the TSP.

The system can also adhere to the bid system by running a reverse auction. In the reverse auction, the bidders for a shipment are given the lowest bid and are given the opportunity to replace with an even lower bid. The TSP looking for the load can then compete fairly in the market and in that way avoid deadheading.

Figure 3:
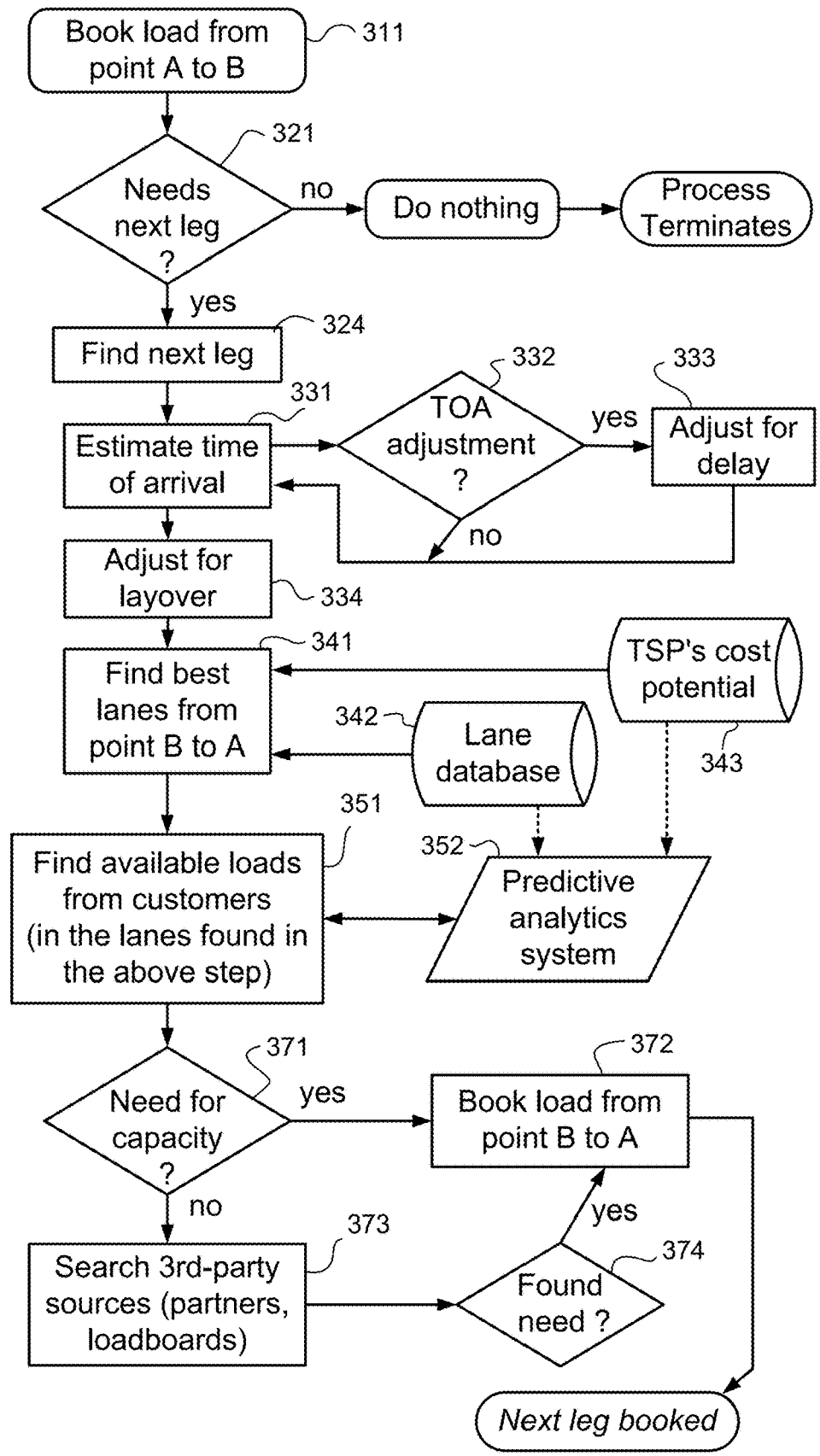
FIG. 3 is a flow diagram showing the operation of a "next leg" function.

Referring to FIG. 3, the "next leg" function is performed in response to booking a previous load (step 311). The sequence varies from the initial bid process in that the "next leg" function is initiated by the requirements of the TSP; however, the financial arrangement for providing transportation services to shippers is similar to that used in the initial bid process.

In response to the booking of the previous load (step 311), a determination is made (step 321) whether the TSP requires (requests) a next leg (step 324). If a next leg is not required, the "next leg" function does nothing and the process terminates. If a next leg is requested, a next leg booking process is initiated (step 324). The estimated time of arrival (TOA) is made (step 331), which will be used for scheduling. A determination is made as to whether there is a TOA adjustment (step 332) based on deviations in the tracking location of the present shipment or an external factor such as traffic or weather conditions. If there is a delay, an adjustment to the TOA is made (step 333). The adjustment may be made based on a calculated TOA or may be input to the TOA calculations as an adjustment, but in either case the result is an adjusted TOA. The TOA or adjusted TOA is then adjusted for a layover (step 334). The adjustment for layover may also be recursed to adjust for deadhead time for connecting to the next leg origin location.

The system determines the best lane(s) for the next leg (step 341), based on demand for transportation services, historical demand for transportation services and cost factors, using information obtained from a lane database (step 342) and from considering the TSP's variable and fixed cost potentially (step 343). The desires of the TSP to remain within a particular geographical territory, the desire of the TSP to return to a home base according to a particular deadline and other routing preferences are incorporated in the determination of the best lanes for the next leg (step 341).

Using the "best lanes" information, the system finds available loads from customers (step 351), using a predictive analytics system (step 352). The predictive analytics system uses historic and present data regarding demand for transportation services and historic and present data regarding costs and availability of transportation services along the lane. The use of the predictive analytics system (step 352) allows the system to suggest a competitive cost for providing the transportation services. It is possible to either propose this price as an "accept or reject" offer to the TSP and an "accept or reject" price offered to the shipper. Alternatively, the TSP can offer the estimated cost as a bid and enter a reverse auction by which the TSP competes with other bidders for the "next leg" shipment.

A determination is made if there is a practical match between what the TSP is willing to accept to haul one of the matching available loads, and the price the via the system the shipper is willing to pay. If so, the load can be booked. If there is no match, then the system researches sources of loads, to try again to match these to the availability of the TSP's next lag capacity, and if such needs are found (step 374) the load is booked (step 372). If a need for capacity exists, then the load is booked; otherwise search third party sources (step 373).

Shipment and Transportation Service Tracking

Since the initial scheduling estimates are available, the system is able to modify these estimates by using updated information. One approach to this would be on-going tracking of the vehicle, which could be used to predict arrival times or a range of estimated arrival times. Since manual reporting can be tedious (or purposely inaccurate), an automatic system is advantageous. One method of tracking is by use of mobile-to-base handshaking, which gives location information at least as precise as the cellular communication base station, and is often more granular, indicating base station quadrant or even GPS location information. Often such information is restricted, however, and the U.S. Telecommunications Privacy Act prohibits telephone tracking for commercial purposes other than to provide the communication service itself. Such restrictions can be waived, so that, for example, "find my phone" services, by-consent tracking and "push advertising" services are commonly available for people who request them.

In the case of transportation services, a tracking service can track the location of the driver's mobile communication device, and hence the shipment. The location can provide three things:
1. The location, which can be used to update arrival estimates. The arrival estimates can also be used to update estimates for "next leg" availability.
2. A relative location to external factors such as reported traffic problems. The relative location can also be derived from initial estimates, but a current location provided more granular information of the location of the load.
3. Direct information as to the current location of the shipment. While the time of arrival or other terminal point information is of primary interest to shippers, receivers and other users of transportation services, the actual current location information may also be desired.

The location tracking, updated estimates and providing of information regarding current location of the shipment may be provided by using one or more computing devices to store the information in one or more databases, and to use the information to calculate the updated arrival estimates. This allows recipients of the information to obtain the information without the need for manual queries and permits unattended updates of information and estimates. The computing devices are able to provide an on-line indication of last location information, and information to display the last location information and an estimate of a current location as map data.

By providing updated estimates on arrival, the consignor, consignee and others responsible for shipping or receiving can easily be able to meet the shipment. The estimates and other location tracking information can be provided to consignor, consignor and other interested parties without providing the telephone number of the mobile communication device. While in some cases, the location tracking information will coincide with the driver's contact information, the driver can separately provide communications contact information and, if desired, use a separate mobile device for location tracking purposes. The location or estimates of time of arrival (TOA) may be made available online. In addition, interested parties may get automatic updates thru SMS, IVR, email and other communication systems.

One of the procedures in selecting the bids is obtaining contact information. In requesting bids, the TSP is asked about acceptance of mobile phone tracking or ELD tracking, and requests a mobile phone number for cell phone tracking, or permission to gain ELD data. An affirmative answer would be sufficient for a shipper to determine whether to accept a price corresponding to the bid, but does not in all cases demonstrate that the driver actually accepts tracking. In addition, there may be circumstances in which the entity placing the bid does not have the authority to consent to location tracking. Upon acceptance of the bid or after the acceptance is confirmed, an SMS text message is sent to the driver, using the provided mobile phone number, requesting the driver to accept tracking. If the driver accepts tracking, the system records the consent on a database and the identification information is provided to a mobile device tracking service. Upon arrival at the destination, a second SMS text message is sent indicating that the tracking service is terminated, and the tracking service itself is terminated. If the next leg is to be tracked, the second SMS text message indicates that the tracking service is being continued through the next leg, in which case the tracking service is continued. The mobile device tracking service also accepts direct requests to terminate tracking; however, since the tracking is limited to tracking the trip by shippers, receivers and other parties interested in the shipment, it is unlikely that the driver will terminate tracking. The system stores records of communications related to acceptance of location tracking by the driver and communications relating to termination of location tracking. In one non-limiting example, the system uses one or more computing devices to keep track of different messages sent to the driver and maintains record of messages received from the driver which is stored in one or more databases.

The tracking service has the further advantage of allowing the driver to complete the delivery without manually updating the terminal as to the TOA.

Figure 4:
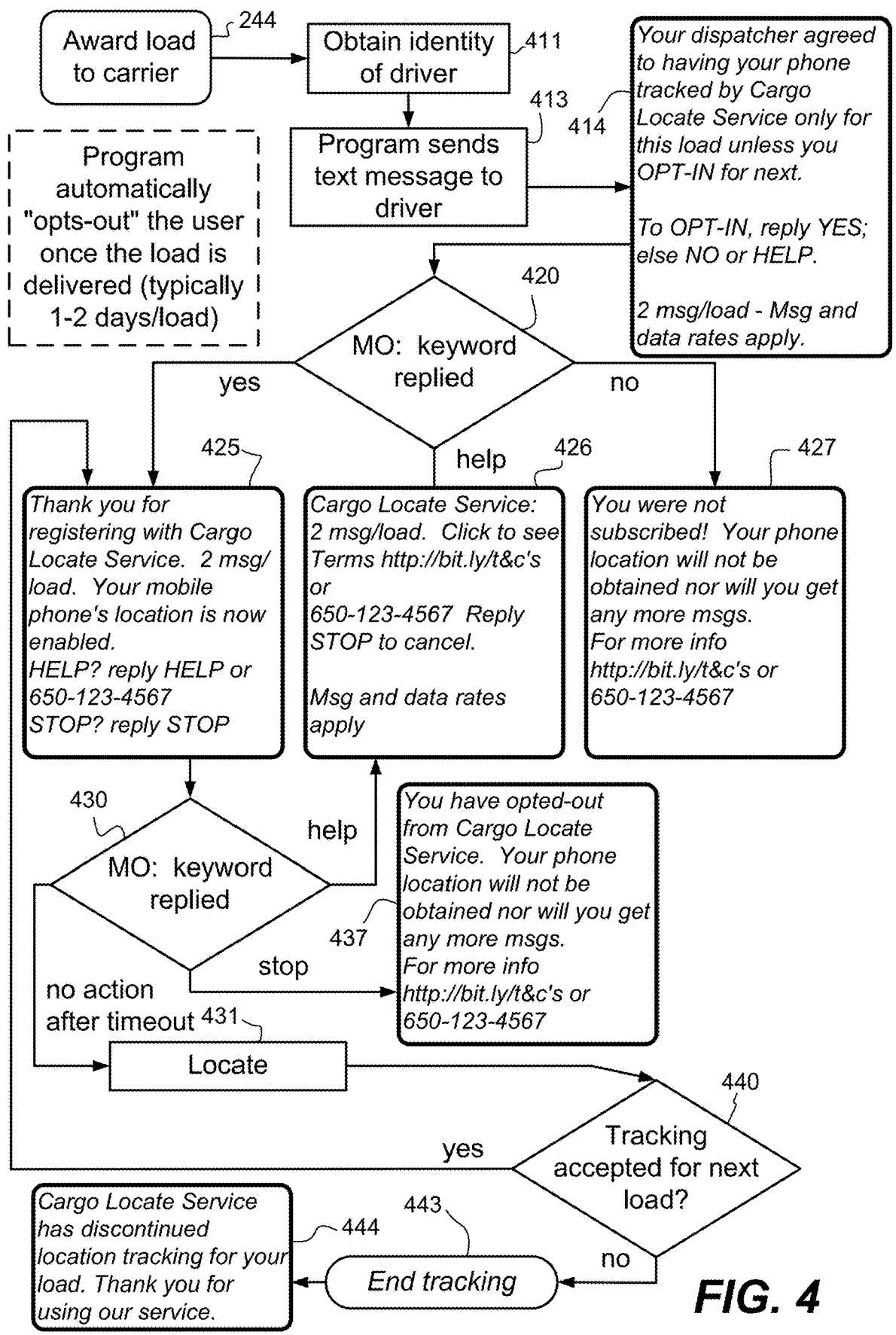
FIG. 4 is a flow diagram showing the implementation of the tracking function.

FIG. 4 is a flow diagram showing the implementation of the tracking function using an automated response unit. The automated response unit uses one or more computing devices and stores data in one or more databases. The tracking function is initiated in response to the bid acceptance system, upon award of the load to the TSP (step 244) but depends on obtaining the mobile phone number for the driver (step 411). The system sends an SMS text message to the driver (step 413) informing the driver of the tracking request (step 414). The automated response unit awaits an SMS reply from the driver of "YES", "HELP", or "NO", and responds accordingly (steps 425, 426, 427). In the event of other than a "YES" response, the system does not engage location tracking, so no action is required to terminate other than to inform the driver that location will not be tracked (step 427) or to enter a "help" menu (step 426). If the driver accepts location tracking, the driver is informed (step 425) and a further keyboard input from the TSP is awaited (step 430). If no further response is received, location tracking is initiated (step 431). The driver is still able to respond with a "help" message, which leads to the help menu (step 426), or can issue a "stop" command, which leads to a termination message (step 437). If location tracking is accepted, a determination is made as to whether the driver will accept location tracking for the next load (step 440), then tracking is terminated as appropriate (step 443). On termination, the driver is informed by a further text message (step 444). The termination message (step 444), in addition to advising the driver that the location tracking is not active, also is important because it lets the driver know that other people (personal and business) who may be using the service, will not be able to receive further updated location information through the service.

Location tracking is separately initiated. By way of non-limiting example, the message may be sent directly or through the location tracking service, and location tracking will not be engaged prior to the driver opting in for use of the service. Since this system cannot approve tracking without actual acceptance by the driver, the tracking service will be able to recognize this process as valid consent to location tracking. In one non-limiting example, the tracking starts as soon as the driver accepts tracking (step 425). The reason for immediate tracking is that the immediate tracking will help at the origin location whether the truck is going to arrive on time or not for pickup or also helps the shipper to track approximate time it takes for the driver to arrive. Since the system is able to provide estimations of arrival times, the actual location of the driver can be withheld until a predetermined time before scheduled arrival.

Figure 5:
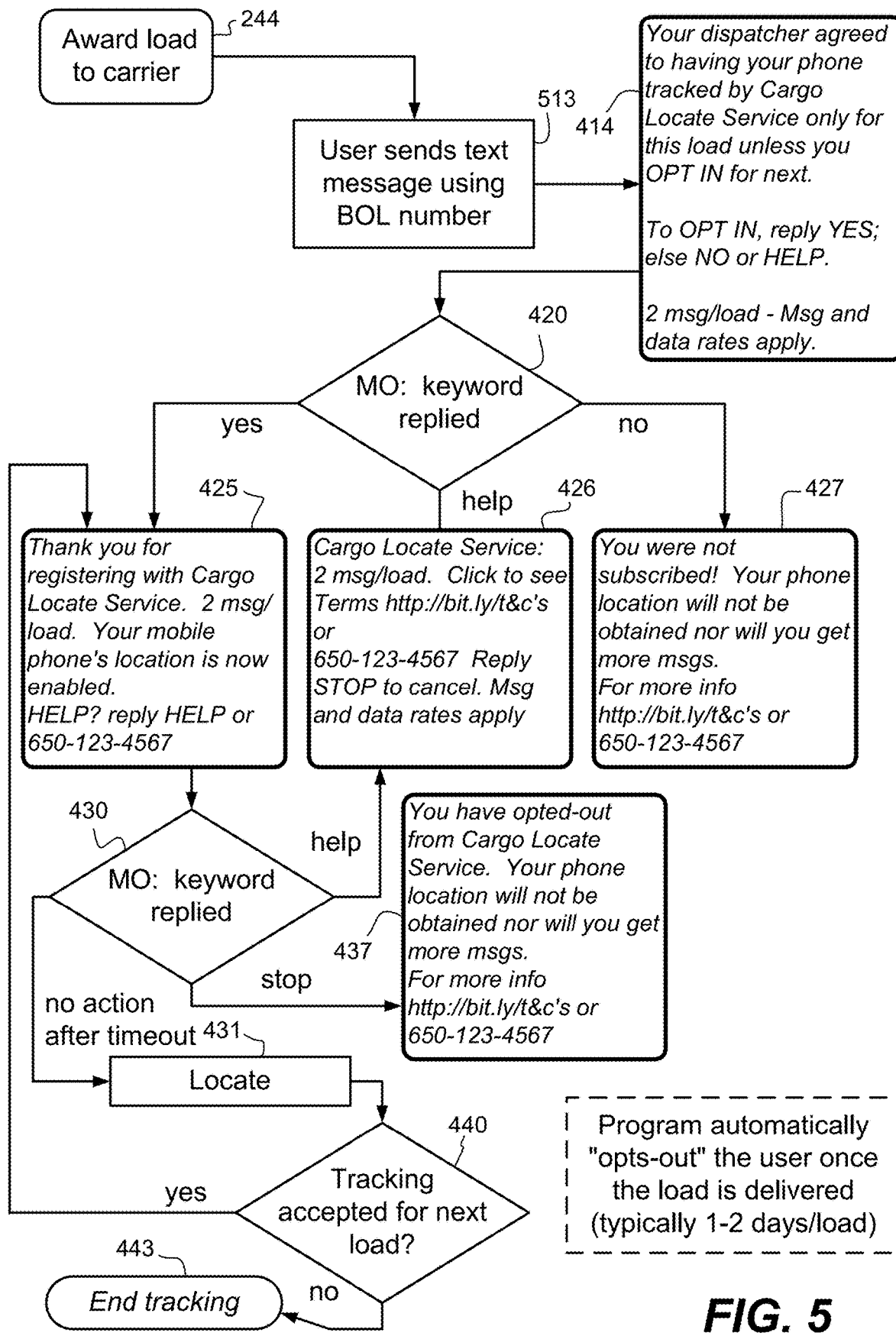
FIG. 5 is a flow diagram showing how a TSP driver accepts mobile tracking on their mobile communication device.

As an alternative to the system requesting location tracking, a user with the driver's contact information may make the request through the system, as shown in FIG. 5 (step 513). This request can use any convenient means to link the user request to the driver, including, by way of non-limiting example, the shipment's bill of lading number. The SMS message may be transmitted through the program, or another technique may be used to link the driver's acceptance to the system. The process for authenticating the driver's "opt-in" acceptance is similar to that of location tracking initiated by the system.

As described above, in an exception to the termination, if the driver is continuing with a further shipment through the system, the mobile tracking service will be continued through the corresponding leg or legs unless the driver terminates tracking.

The tracking information can be useful in assuring shippers and receivers of the whereabouts of their shipments. It is also useful for determining availability of the shipment for logistics purposes, and for purposes of planning terminal operations, such as loading and unloading, hiring of lumpers (if not hired by the driver), etc. In the case of non-cargo loads, the tracking information can be used to provide current updates on the exact time of arrival or pick-up, for example for passengers meeting a transportation service.

The tracking information can also be used for tracking information and lane data about supply and demand for the lane in question. This tracking can in turn be used to predict revenue that could be obtained from alternate shipping lanes as calculated by one or more computing devices. As a result, it is possible to use the tracking information to predict gross margin or operating margin that could be obtained from alternate shipping lanes. The tracking information may be used either with or without lane data to predict the gross margin or operating margin. The revenue, gross margin and operating margin predictions can be applied to predict likely revenue, gross margin and operating margin prediction for the transportation service provider from travel along one or more additional lanes by using the tracking information and lane data related to supply and demand for the additional lane in question to predict revenue from operation on that lane, along with predicting gross margin or operating margin expected from shipping on that lane. The tracking, use of the tracking information to predict margins and revenue and to use the tracking information and lane data may be performed by one or more computing devices.

Communication of Vehicle Status Information

The ability to automatically communicate with the brokerage system also allows direct to carrier communications or indirect communications to the carrier through the brokerage system to provide status updates. This information enables the carrier's dispatch office, maintenance department, or another office to have information regarding the present location of vehicles in its fleet, as well as arrival estimates and the like.

Further information which may optionally be provided would be maintenance information provided by on-board vehicle monitoring systems. By way of non-limiting example, this may include:
  tire pressure,
  air pressure of the vehicle suspension,
  oil and fluid status,
  engine performance status. and
  engine diagnostics data.

The system can also monitor vehicle speed. The vehicle speed, if monitored, could be used to optionally be included in bid submissions. Since it is expected that most over the road haulers would be likely to operate at about the same speeds, this additional information, if provided, could be used to assure shippers of safe operation or timeliness of delivery. The information provided can also include historical speed and speeding incidents of the driver and of that carrier.

While some of this data, e.g., pressure data, is readily available to the driver, providing the information to dispatch provided an indication as to whether the driver is exercising proper on-the-road maintenance. Additionally, the data may be suggestive of ongoing maintenance issues, such as a "leaker" tire, so the issue can be properly addressed either at the depot or, if necessary, on the road.

Time Estimates and External Factors

In addition to tracking, external factors affecting scheduling are tracked using one or more computing devices. The most common of these factors are weather and traffic. Since the location tracking indicates the current status of the route used by the TSP, the external factors can be applied to the particular route. While weather may have a more widespread effect, the effect of weather on routing is generally minimal, with some exceptions. Traffic conditions do tend to depend on the route. Traffic and weather can be obtained from various external sources and can be either input automatically or manually input. Once input, the external factors can be integrated with location tracking information so that it becomes possible to account for the effects of the external factor based on the actual location of the driver.

An additional source for determining the effects of external factors is location tracking and other information relating to delays affecting other shipments. For example, if a snowstorm is affecting a major route along a particular shipping lane, that information can be used to predict the effect on a particular shipment.

The external factor is combined with the location tracking in three ways:
1. Location tracking identifies the route taken. Even if the route was taken to avoid the external factor, such as localized weather or traffic problems, the external factor will then be applied to the actual route taken.
2. On any route, location tracking gives a fairly accurate indication of where the load is in relation to an obstruction. If, for example, the obstruction results in an extended backup, but the TSP is nearly past the obstruction, the estimates would be different than if the TSP has just reached the backup. On the other hand, location tracking cannot determine if the driver will take a detour, but this ambiguity can be addressed by providing a range of estimates. Similar considerations are taken when it is not clear as to how the delay will affect scheduling.

3. This type of integration also has the advantage that it can take into account of travel factors, such as the driver being at a rest stop and therefore possibly being unaffected by the external factor. Since the driver is automatically tracked using location information, it is not necessary to call the driver to obtain relevant status updates.

One advantage of updated scheduling estimates is that the receiver, a subsequent shipper or terminal services can monitor when the TSP is expected to arrive. It is also possible for the system to provide the driver with information on avoiding delays, for example by advising the driver of detours, should this service be desired.

The updated scheduling estimates are advantageous when handling valuable cargo, in that shippers and receivers can monitor the transfer of shipments. This is particularly useful in circumstances where the cognizant people are not at the transfer facility on a continuing basis. This also increases the efficiency of the TSP in that the people responsible for transferring the load are given sufficient information to be available for loading and unloading.

The estimated arrivals are implemented with a service which determines matching load or transportation services with TSPs. After obtaining transportation services from a TSP, an estimate is made of a time of arrival (TOA). One or more external factors, such as weather and traffic conditions, are used to modify the estimate. If the use of a location service is provided as a part of the agreement to provide transportation services, the location service is compared to an anticipated location of the driver, using time and distance and mapping software, in order to update the estimate. If, for example, the driver has already compensated for anticipated delays or otherwise avoided the effect of the delay, the estimate would be updated in accordance with the driver's present location. The adjustment in the estimate also takes into account the effect of the external factor on the driver's actual route and location. By way of non-limiting example, the external factor can be input to adjust a Dijkstra time-and-distance calculation or to adjust a modified Dijkstra time-and-distance calculation, to update the estimate. One or more computing devices may thereby be used to update the estimates of the time in transit and delivery time of the load or completion of the transportation service, based on a combination of the location tracking and said at least one external factor by adjusting Dijkstra or similar map routing calculations to render adjusted time of arrival estimates. Therefore, for example, a determination of whether the driver has passed a traffic delay or can be expected to encounter the delay on the driver's route would be used to adjust the estimate.

The adjusted estimate is also made available to the shipper or receiver, or in the case of passenger services, the passenger, who may be arranging to meet the TSP or may be en-route with the TSP, as well as to those arranging to meet the passenger.

In most cases, the delay would not result in a change in arrangements to use transportation services; however, there are instances in which an entity using transportation services would change TSPs in response to rescheduling. In the event that a user of the transportation services has the opportunity to change TSPs, the updated estimate can be used to provide the user with updated information with which to make such a decision. The updated information may also be used to arrange a new shipment or transportation service for which the TSP may meet in accordance with the revised estimate. This affords the timing and scheduling convenience of non-reserved transportation services when using reserved transportation.

As with cargo shipments, updated scheduling information is convenient for passengers. The updated information makes it easier for passengers to meet TSPs and enables people meeting the passengers to know when they arrive. Significantly, for passengers, the wait time at the meeting point is often more important than the time of departure or arrival.

While in most instances, the updated scheduling will not affect selection of the TSP for handling the transportation service, there could be some instances in which re-scheduling with other TSPs is desired. Such instances would be likely to occur in markets or circumstances in which it is easy to locate other requests for transportation services. In such instances, the early availability of updated scheduling estimates can be used to provide the TSP with a different load. Such an arrangement can help users of transportation services who rely on "just in time" availability of transportation services, and can help the TSPs who wish to minimize turnaround time.

Cost Estimates and Pricing

The costs entailed by a hauler can include a number of factors that can be broken down for cost estimation, using data from a cost estimate database. These factors can comprise, by way of non-limiting example, fuel cost and time to divert to pick up and drop off shipment, time, lumper expense and other incidental costs for loading and unloading the shipment, additional fuel costs attributed to carrying the shipment, potential for delay of the truck due to after-hours arrival, apportioned highway taxes and tolls, and lost opportunity costs resulting from the additional time consumed by engaging in the shipment. The cost estimation can then be used by one or more computing devices to calculate revenue, cost and profit.

Since the costs and the market price of transportation services can be determined or calculated, the TSP can be offered an amount of compensation for any given trip. This is particularly useful for backhaul or next leg trips, in that the TSP can accept the amount without the need to enter the bid process. This places the TSP in competition with bidders, but it is possible to include the particular TSP and all bidders with a "reverse auction" by which the lowest bidder is submitted for selection by the shipper. Since the TSP looking of a next leg is to some extent committed to making the trip, that TSP has an incentive to provide a lower bid.

The cost estimates can also be used to determine the cost of deadheading or waiting for a bid, vs. taking a low cost shipment. These estimates can be made granular enough that the TSP can describe a cost differential that would render sufficient profit (or reduced loss) for the TSP to accept a shipment. Thus the required compensation to compensate the TSP for additional fuel, wear and apportioned road use fees can be estimated and compared to a deadhead shipment. As an alternative, the information can be used to give the TSP a range of expected prices, so that the TSP can elect to wait for a load rather than deadheading.

Figure 6:
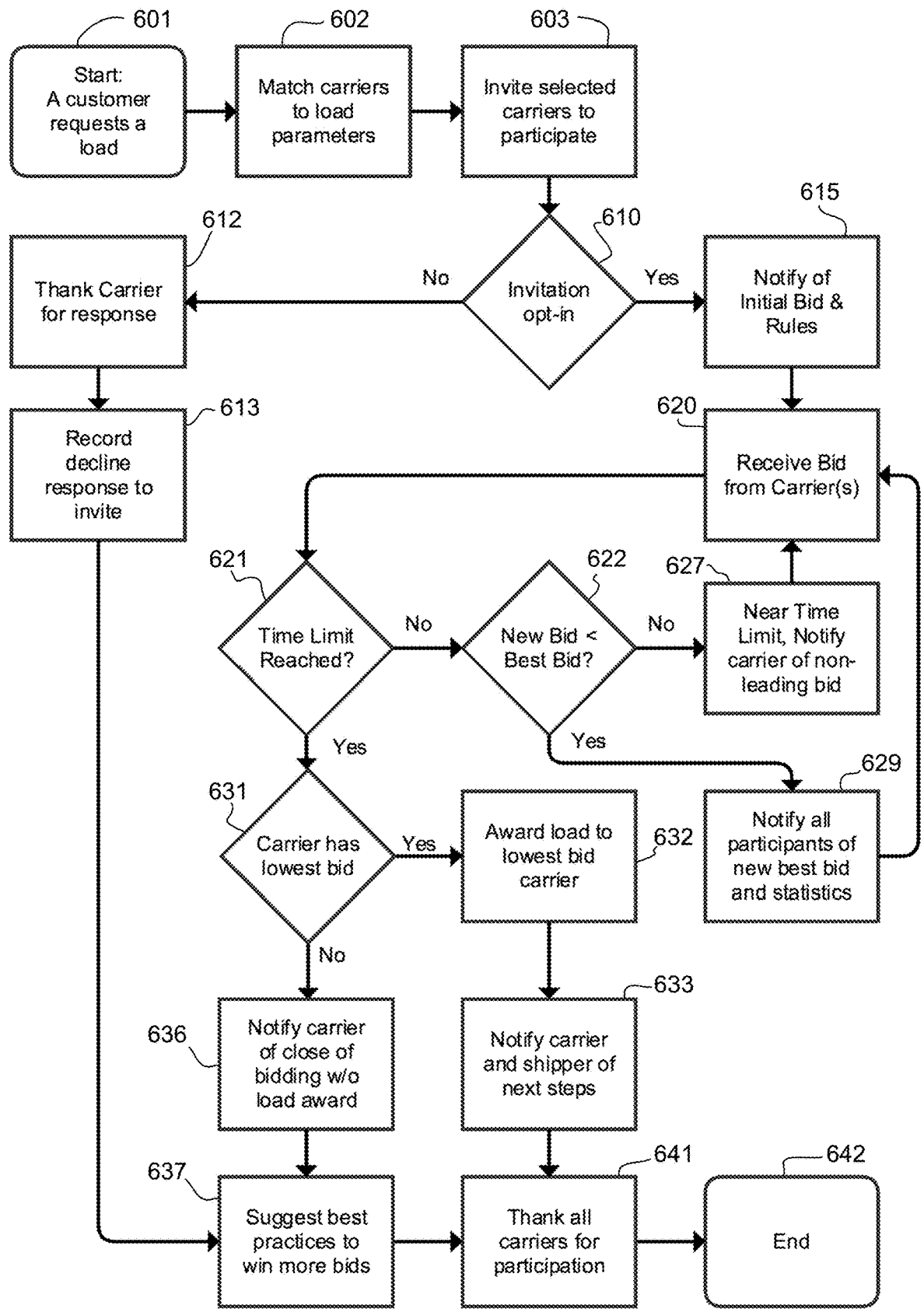
FIG. 6 is a flow diagram showing a bid selection process.

FIG. 6 is a flow diagram showing a non-limiting example embodiment of a bid selection process. This bid selection process is similar to that depicted in FIG. 2, in that the bids are received from multiple TSPs with the focus on finding a carrier for the load.

The bid selection process starts when a customer requests a load (step 601). As will be described, the bid selection for drivers requesting a load, for example for backhaul trips, uses this bid selection process.

On receiving the request (step 601), the system matches TSPs to load parameters (step 602). The match is made by lane history, headquarters or home base location, acceptance by the driver of location tracking for cargo tracking, information obtained from location tracking or cargo tracking, capacity of the TSP, past bidding history and history of participation declines.

In considering participation declines, distinctions are made between declines based on preference and declines based on circumstances, such as existing loads. The driver or TSP is able to override the decline history by modifying their profile; however, by filtering for declines, the system avoids sending unwanted invitations and is able to provide invitations for which the TSP is likely to be interested in bidding. The selected TSPs are then invited to participate in the bidding process (step 603). The invitations are transmitted using preferred communication methods. The preferred communication methods may comprise, by way of non-limiting example, mobile communication device app, email, phone, SMS, a website "chat" or messaging function, or instant message.

The bidding TSP is then able to "opt-in" or accept the invitation to bid (step 610). Unless the TSP has set other preferences in a profile, a default opt-out is presumed after a predetermined period of non-responsiveness, for example 10 minutes. This provides a simple method for opting in or opting out, requiring a single effort. The "opt-in" is an acceptance of an invitation to bid, and the "opt-out" is a decline. The bidding "opt-out" applies to the current load, but the bidding TSP's "opt-out" is also used for future invitation qualifications, applying a long or indefinite time limit. As in other inferred preferences, the driver or TSP can override the preference by changing their profile.

In the case of communication methods allowing retraction of messages, the message inviting the TSP will be retracted at a default opt-out time limit or a predetermined time after the default opt-out time limit. By way of non-limiting example, a driver may receive an invitation to bid by mobile communication device while driving. If the driver is interested, the driver will be able to pull over during the "opt-out" time period and respond, but if the driver is not interested, the system will accept that the driver is not interested. If the deletion occurs at a later time, the driver will still be able to retrieve the message and respond, despite falling under an "opt-out" status. For the purpose of the bid, there would be no distinction between an opt-out done intentionally by a carrier and one that happens automatically by timing out.

The "opt-in" and "opt-out" function can also accommodate TSPs who need more time to respond. Thus, if a driver receives a message regarding an invitation to bid, the driver can indicate an interest, without immediately bidding, provided that there is sufficient time to submit the bid before the auction closes.

If the TSP "opts-out" or is "opted-out" by not responding to the invitation within the default time period, the TSP is thanked for the response (if appropriate) or the response is acknowledged (step 612) and the decline is recorded (step 613). The best time window for bidding will be determined by the needs of the shipper or other consumer of transportation services and the pattern of responses received on invitations for bids. A primary purpose of recording declines is to increase the percentage of invitations for bids that are of interest to the TSP, and correspondingly reduce the percentage of invitations for bids that are not of interest to the TSP. Ideally, the TSP would primarily receive invitations to bid that the TSP will be interested in and that the TSP will be likely to win and of course not receive invitations for which the TSP is either not interested in or is not likely to win.

If the invitation for bid is accepted ("opt-in"), the TSP is notified of the initial bid and rules (step 615). The rules include general rules, such as how the reverse auction works, and rules specific to the bid, comprising, by way of non-limiting example, an initial bid set by a pricing engine, timeframes for start and end of the bidding, load parameters and bid increments.

Bids are then received from TSPs (step 620). On receipt of the bid, a determination (step 621) is made as to whether the time limit for bidding has been reached. If the time limit has not been reached, a determination (step 622) is made if the bid is a leading bid. Since this is a reverse auction, the "leading bid" would be the low bid unless other qualifications are used to adjust the bids. Therefore, a "leading bid" would be the lowest bid. Alternatively, other terms can be used to adjust that status. By way of non-limiting example, if the shipper prefers shipment tracking and has valued shipment tracking at $10, then a corresponding adjustment will be made to the bids.

If the new bid is not the leading bid, then a determination is made of whether the bid is near the time limit for bidding as a "bid check-up" function (step 627). In the case of the leading bid and other bids that are not in the lead position, the bidders are notified (step 629) of the leading bid, or, in the case of the leading bidder, the next best bid. Depending on the criteria for the auction, the bidders may also be given the names of the TSPs bidding for the load. Bidders are also given access to a history of similar auctions for similar loads.

If the time limit is reached (step 627), the carrier with the lowest bid is determined (step 631). That carrier is awarded the load (step 632) and notified (step 633), including notification of next steps, as described previously with reference to FIG. 2.

The carriers who did not win are notified (step 636) and notified of the winning bid. The non-winning bidders are also given information suggesting best practices for winning more bids (step 637). This information is also offered to bid invitees who declined (steps 612 and 613). The "suggesting of best practices" (step 637) includes suggestions encouraging the TSP to self-profile in order to increase the ratio of invitations that lead to successful bids over invitations leading to losing bids or declines.

After notification of the winning bidder (step 633), if the winning bidder accepts the shipment, or with the suggestion of best practices (step 637), the bidding is terminated. The system transmits an acknowledgement and appreciation of the participation of the bidders (step 641) and terminates (step 642).

"Find Me a Load"

This bid selection process, such as that depicted in FIGS. 2 and 6, relies on bids received from multiple TSPs with the focus on finding a carrier for the load. This is essentially focused on the shipper, in which the shipper's load is "shopped" to multiple TSPs in order to obtain the transportation service for the shipper. This process contrasts with finding a load for a particular TSP, in which the focus is on finding a load for the carrier. In order to achieve the goal of finding a carrier for the load (responding to the shipper's request) and finding a load for the carrier (responding to the TSP's request), the function of finding a load for the carrier is adapted to function within the framework of finding the carrier for the load. By using historical and present data, it is generally possible for the TSP to find a load within a reasonable time frame while offering the shipper competitive bidding as described in connection with FIGS. 2 and 6.

The bidding process for finding a load differs from the bid selection process that focuses on finding a carrier for the load, although the end result remains matching loads to TSPs. For a given driver, potential loads are ranked to establish a minimal physical parameter match. Criteria comprise, by way of non-limiting examples:

current location,
desired end location or region,
load origin,
load destination,
current location dead-head miles to origin (Do),
desired end location/region dead-head miles to destination (Dd),
origin to destination mileage (M),
rate per mile (R) e.g., (ADo+BDd)/(CM*DR), where A, B and C are assigned variables.

The rate per mile (R) may, by way of non-limiting example, be determined as $$R = (\text{negotiated rate})/(\text{number of miles from load origin to load destination}).$$

Many variables may be used to determine a match, such as, by way of non-limiting example:

on-time percentage,
safety rating,
deadhead miles at origin (Do),
deadhead distance (Dd),
number of loads in the last 30 days,
number of loads in the last 360 days,
size of fleet,
age of fleet,
price competitiveness,
damage percentage.

In calculating rate per mile, smaller numbers for deadhead miles are ranked lower (zero is ideal—no dead-head miles, long trip, high rate).

Driver or TSP provided profile data are also used when ranking loads. Driver or TSP data may be used to change calculated factors or factors determined by historical information concerning the driver, or may be used to supplement stored or calculated data. Potential loads are filtered based on driver optionally defined parameters or profile information. Such profile information may comprise, by way of non-limiting examples:

headquarters,
equipment type (van, reefer, flatbed),
equipment details (53', 48', temperature range, specialized capabilities),
favorite lanes,
load descriptions,
geography serviced or operating jurisdictions,
preferred time of day,
preferred day of week,
toll sensitivity,
single/multi-stop,
team loads,
service history,
safety performance.

In addition, other variables, such as, by way of non-limiting example, the additional variables mentioned above may be part of the profile information. The driver is also permitted to choose negative associations, e.g., no hazardous materials.

External public data sources are also provided as a data input to filter potential loads. Such external data comprises, by way of non-limiting example in—based transient loads.

Non-driver related parameters that limit the physically possible options are used to filter potential loads. Non-driver related parameters comprise, by way of non-limiting examples:

pick-up window (or distance to pick up),
delivery window,
traffic data,
weather,
fuel prices,
road repairs,
regulatory limitations,
toll roads.

Driver load history based on previous use of the disclosed system is useful for determining potential loads. While the driver can change most of these preferences, driver history provides a good starting point to evaluate which loads will be preferred by the driver. Criteria for filtering potential loads based on driver load history with the disclosed system can comprise, by way of non-limiting examples:

lanes,
pricing,
reliability,
win/loss ratio,
cancellations,
on-time delivery,
relative safety performance
hours of driver availability.

Machine learning is used to determine non-user defined preferences and add to the driver's profile for filtering and ranking. These become inferred positive and negative preferences. Non-limiting examples are:

Learn driver positive preferences from common values in loads selected for bid: lanes, geography, pricing/rates, equipment type. Add this to the driver's non-user defined profile.

Learn driver negative preferences from declined loads: deadhead distance (e.g., not more than 100 miles), timing (e.g., evening driver, or no northern loads in winter), geography (e.g., no dense urban areas, no mountainous lanes), rates (e.g., nothing under $2/mile), equipment (e.g., no reefers) and add to the driver's non-user defined profile.

Show specific loads for the purposes of determining driver preferences: e.g., show three different equipment types in the first three loads to determine their equipment preferences, show three different destination regions with the same origin to determine a geographical preference. Get the driver to reveal their behaviors by their positive and negative responses to contrasting loads.

It is also possible to provide a more direct "learning" mode that does not show real loads but instead is an opportunity to interview the driver for their preferences instead of requiring the driver to fill out a form. In the learning mode, loads are carefully presented that will reveal their ranking by the particular driver. The driver is then offered a review of final selections for refinement of preferences. In general, much of the data used is considered predictive of preference. Since the preferences are straightforward, the driver is able to make changes to the preferences, and therefore, most of the rendered data can be changed by the driver. The review affords the benefits of automated evaluation of preferences while avoiding restricting the driver to the automated selection process.

The learning mode has the advantage of reducing the effects on the learning process of variables that change over time but are otherwise unrelated to the driver's general preferences. Similarly, by examining driver preferences under a single test sequence, it is possible to avoid distorting the preferences by reading segments of the driver's preferences at different times under different circumstances. Additionally, the learning mode allows the system to recognize driver preferences at an early stage instead of relying solely on developing a bidding history.

During selection, it is possible to look ahead for ranking based on real-time behaviors. For example, if a driver just picked up a load for a dry van, it is possible to re-rank based on the tighter criteria. In doing this, the system pre-calculates a tree of potentials based on yes/no responses for quick turn-around of next potential load. In the example, the driver may indicate a refrigeration capacity, so that even though a dry van load was previously carried, the driver is able to accept refrigerated loads.

It is possible to infer a desired front-haul or backhaul based on loads accepted and other data relating to the driver. An attempt to detect front-haul and backhaul trips is based on loads. The loads selected for consideration and any set parameters e.g., a specific origin (e.g., Dallas) and a non-specific destination (East Coast) may indicate a backhaul. If a back-haul detected, the system will look for multi-stop returns. An origin near their headquarters may indicates a front-haul. If front-haul detected, a backhaul is recommended after selection of the front-haul trip.

Multiple load options are offered for consideration in parallel so driver can prioritize, bid or reject simultaneously. The driver is allowed to make a selection from the multiple-load options. The trips are sorted on all criteria and the criteria and selections are used to infer driver preferences. This selection encourages a rough sort of several loads followed by a final review to pick the best fit. This provides a greater volume of general data for positive/negative preferences as well as fine tuning on positive preferences. The results are inferred preferences from parallel/grid presentation and search criteria.

The preferences are evaluated as absolute preferences, preferences which are not absolute, but which are considered along with other factors, and preferences that are considered competitively. An absolute preference would be a criterion which would cause a driver to decline a load under most or all circumstances. A non-absolute preference would a factor which would enter into the driver's decision to accept a bid or which would result in the driver either having a strong incentive to obtain the load (favorable preference), or which would result in a relatively high bid or to decline to bid (unfavorable preference). A competitive preference is similar to a non-absolute preference in that it would result in an incentive to obtain the load or to bid high.

The preferences establish a predetermined threshold, which is either absolute or relative. An absolute threshold would be one that is not significantly affected by competition, whereas a relative threshold is one that is established by viewing the availability of competition.

In the case of a particular backhaul, comparisons are made between nonstop backhauls and multi-leg backhauls. The considerations are the additional time, distance and dead-head distance to accept two separate loads making up two segments, vs taking a single load to the end destination. This takes into consideration supply and demand, dead-head miles to a "hot" market origin and routing through "hot" markets for multiple stops for higher payments.

Figure 7A:
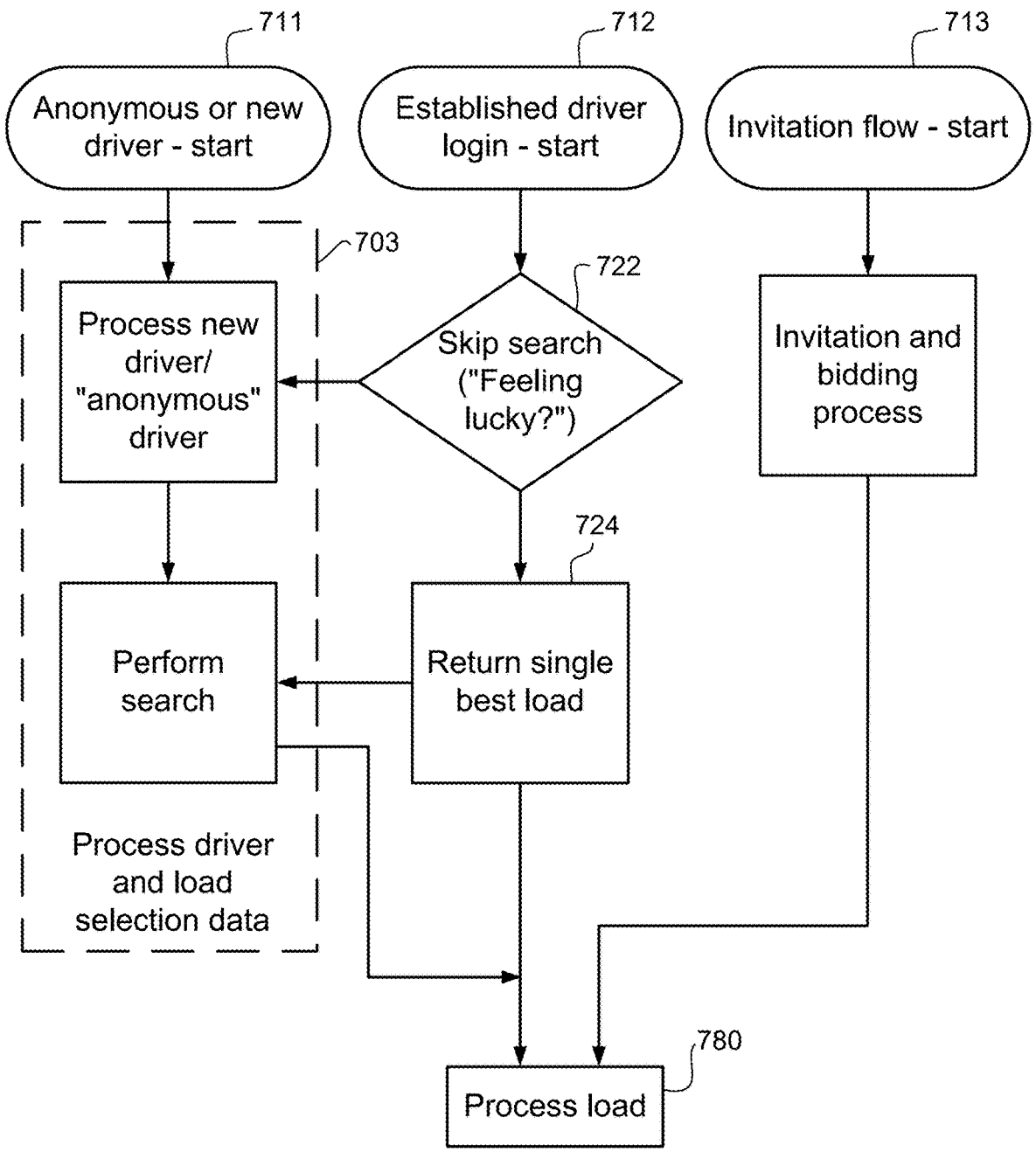
FIGS. 7A-7D are flow diagrams showing a non-limiting example of a bid selection process used to locate a load for a particular driver.
Figure 7B:
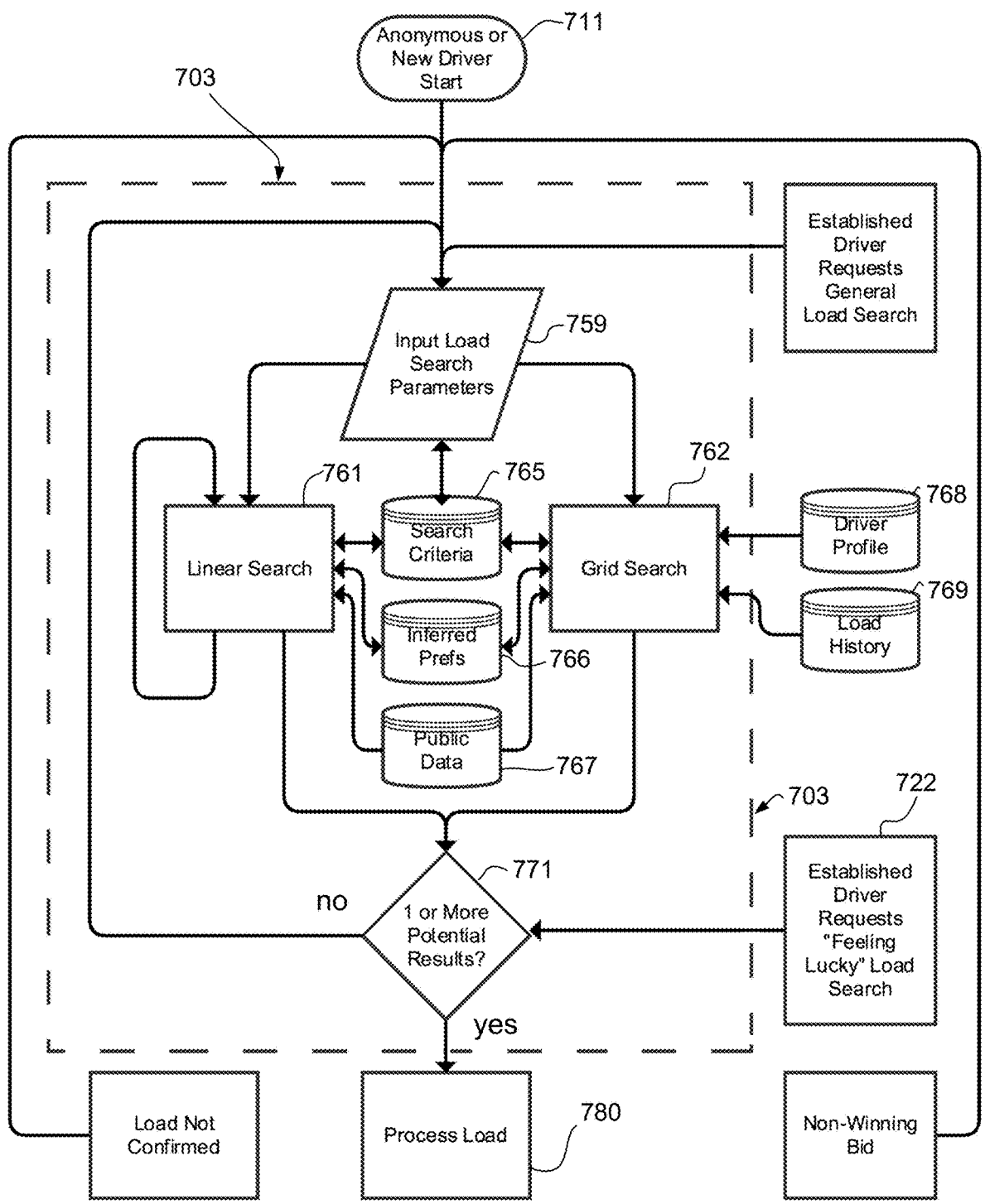
Figure 7C:
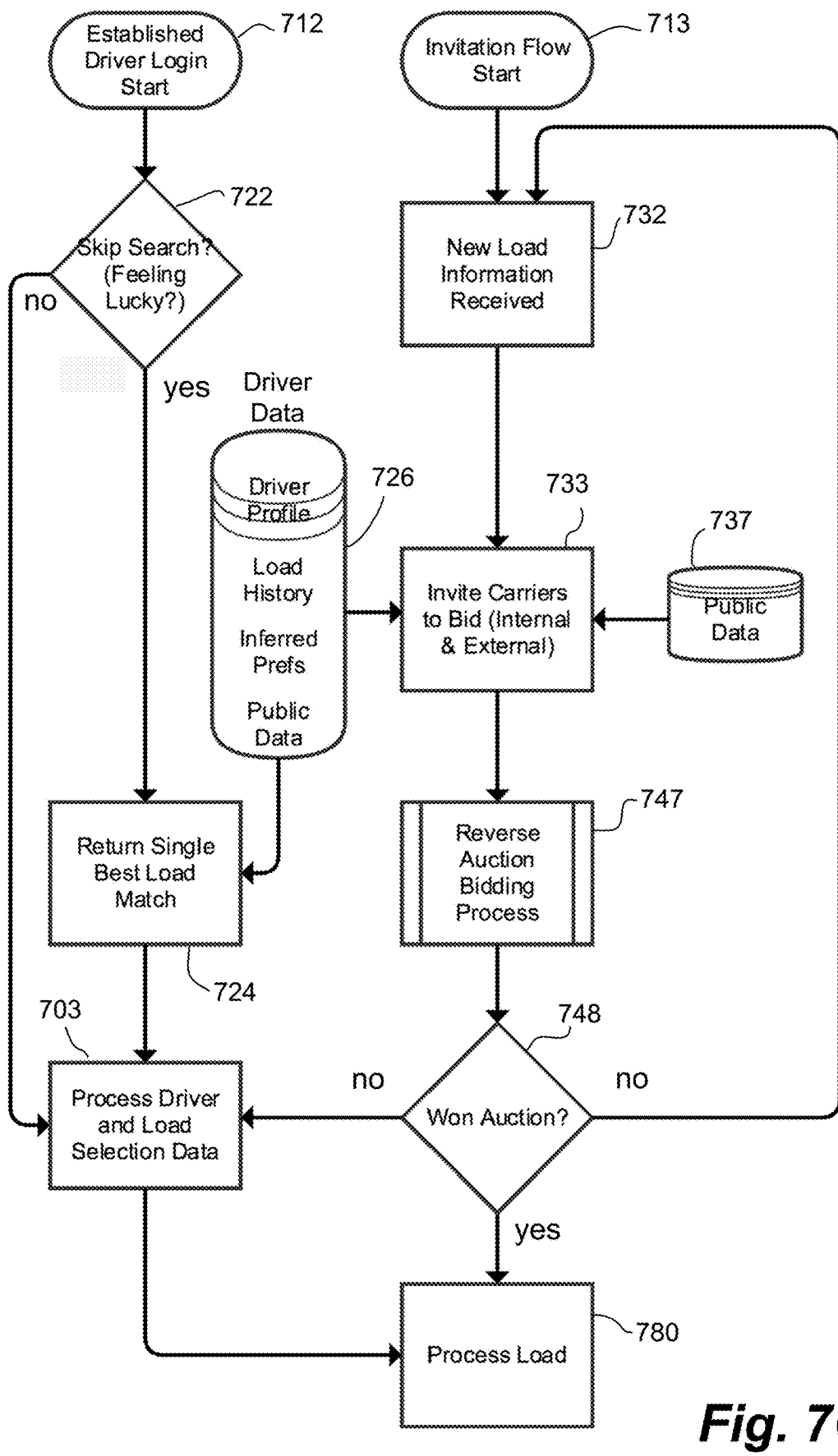
Figure 7D:
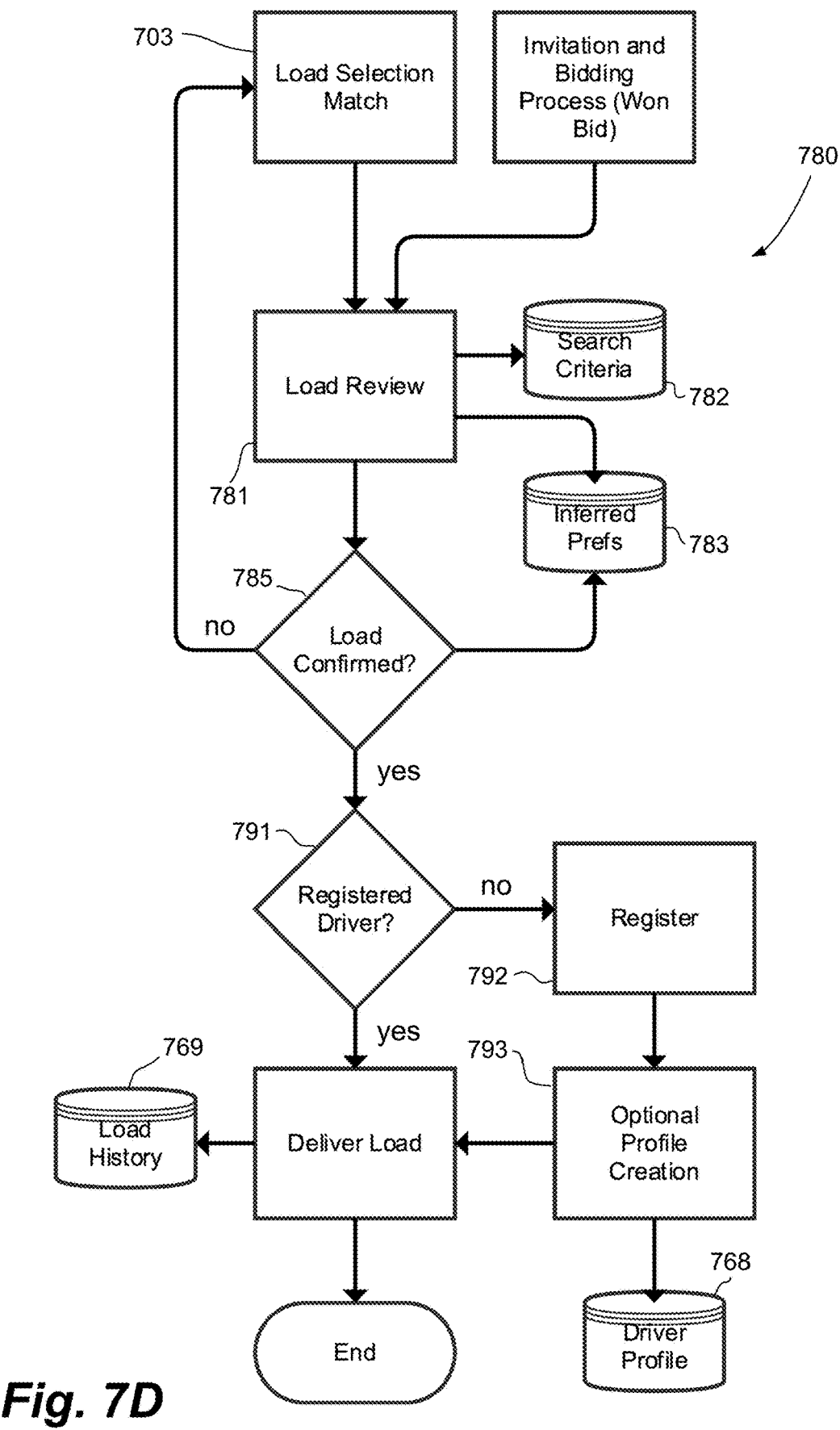

FIGS. 7A-7D are flow diagrams showing a non-limiting example of a bid selection process used to locate a load for a particular driver. FIG. 7A is an overview diagram, with FIGS. 7B-7D showing details of the features of FIG. 7A. This process is intended to work within the framework of the bid selection process of FIG. 6, but with the focus on finding a load for the particular driver. While a "driver" is described, the criteria may be for a particular truck or a particular TSP. It is noted that some preferences, such as turn-around time will often apply on a per-driver basis, but may also be affected by the business operations of the TSP. It is also likely that some institutional preferences, such as home base, will often occur on a per-driver basis, but will also be dependent on the TSP.

The search for a load implements the process as described in connection with FIG. 6. The search is implemented through a bid selection procedure similar to the bid selection procedure described in connection with FIG. 6, but accepts bids based on criteria of the driver or TSP. Additionally, the process utilizes a process for analyzing driver or TSP data (step 703). The search is initiated by an anonymous or new driver search request (step 711), an established driver search request (step 712) or an invitation flow start (step 713). A backhaul search can be in all three driver categories. The anonymous or new driver search request (step 711) can be invoked by any driver, using new information or some stored information, and gives drivers an opportunity to participate without "joining" or participating on the basis of the full complement of data stored in the database. As with other e-commerce sites, anonymous participation does not carry benefits or penalties, but does not take advantage of information in the system's databases.

In the case of an established driver (step 712), meaning a driver or TSP who has an established profile with the system, the driver is given a "skip search" option (step 722), sometimes referred to as a "feeling lucky" option because of its similarity to Google's "feeling lucky" search function. The "feeling lucky" option allows the system to select a single best load match. If the "feeling lucky" selection (step 722) is declined, the system proceeds with the driver or TSP analysis (step 703) in the same manner that would be initiated if a new driver logs in or the driver logs in anonymously (step 711). The exception is that, by logging in, some of the information needed for the driver or TSP analysis (step 703) is already filled or populated.

If the established driver (step 712) accepts the "feeling lucky" option (step 722), then a single best load match is selected (step 724), and a part of the driver or TSP analysis (step 703) is bypassed, as will be seen. The selection of the single best load match (step 724) uses driver data from a driver data database 726. Driver data database 726 comprises data for registered drivers and is obtained from various sources including registration, previously-performed driver or TSP analysis processes (step 703). Driver data database 726 is used for registered drivers without search criteria provided in the established driver search request (step 712) or an invitation flow start (step 713).

Driver data database 726 is also used in the process following invitation flow start (step 713). The initiation flow start (step 713) is followed by new load data received (step 732). The invitation flow start (step 713) is just the beginning point of the process; but not the invitation itself. The new load information received is from the shipper, then carriers are invited to bid. In that sense, there is no "initiation request" in the flow.

At that point, the driver or TSP is invited to bid (step 733), with the selection of drivers or TSPs invited being performed accordance with information from driver data database 726 and public data 737. A bidding process (step 747) is initiated as a reverse auction (lowest eligible bid wins) and a determination (step 748) is made as to whether the driver or TSP won the auction. If the driver or TSP won the auction, the driver or TSP analysis processes (step 703) is bypassed for purposes of acceptance of the load, although the driver or TSP analysis processes (step 703) may still be used to build driver data database 726 for future use. If the driver or TSP lost the auction, then the process is looped back to new load data received. Alternatively, or additionally, the driver or TSP analysis (step 703) is performed.

The reverse auction process (step 747) only occurs for the invitation flow (step 713), but not for the anonymous new driver or established driver flows (steps 711 and 712). That is due, in part, because anonymous and established drivers are actively searching for a load that may or may not exist. For the reverse auction, a load will have been specified and the drivers (drivers, dispatchers or TSPs) are being invited to participate in bidding. One is supply side (the drivers, dispatchers or TSPs), whereas the other (the shippers) is demand side; thus the differences between search and auction. This also implies that some loads are assigned an auction and some loads are directly assigned drivers with no auction. If the flow is an auction, the shipper is given a final price and driver at the conclusion of the auction. If the flow is a search for a load, then the driver, dispatcher or TSP submits their bid for a matching load and the shipper is shown the bid immediately. A shipper may have multiple bids and drivers to choose from and may even reject all of them.

Invitation flow drivers are looped back both to invitation flow ("new load received") and the data for anonymous data, but for new data is only looped back to new data. That is because an invited driver, dispatcher or TSP can be invited again in the future when a new load is available. The invited driver, dispatcher or TSP can also search for available loads, as they are an established driver (otherwise they could not have been invited). A new or anonymous driver, dispatcher or TSP that does not win a searched load is still considered to be new or anonymous to the system and cannot be invited to an auction.

The driver or TSP analysis (step 703) is initiated on receipt of request from an anonymous or new driver (step 711), established driver (step 712) declining a "feeling lucky" selection (step 722) or invitation request (step 713) resulting (step 748) in a lost auction. In response to initiation, an initial load of search parameters is used (step 759). This results in a linear search (step 761) or a grid search (step 762). The distinction of the linear search (step 761) and grid search (step 762) controls how the search is presented to the driver or TSP. For a grid search, appropriate for a larger tablet or desktop, the driver or TSP is provided with a display of all the potential matches on a single screen in a "grid" fashion, with selections presented in a ranked order according to criteria. Default criteria are provided, but the driver or TSP can select other criteria for ranking the selections. By way of non-limiting example, the default display order would be earlier pick up time. The user (driver or TSP) would then be able to re-sort the grid according to any parameter that is provided, so, for example, the driver or TSP may care most about the amount of payment. The system would allow users to add and/or remove criteria if desired to enhance their search, e.g., to add deadhead miles at origin. The exact criteria considered and sort order could be used to infer their preferences. Alternatively, the user could do a formal definition of data columns and sort order.

The sort order also permits drivers or TSPs to rank the selections or loads in a preferred order, so that, if the driver or TSP does not get the first choice, the system would automatically select the next choice.

A linear search (step 761) is more appropriate for use with for a phone or smaller tablet. In the linear search, the user (driver or TSP) is provided with a display describing a single potential load at a time based on our default sort order or pre-set user preferences. The user accepts or rejects each load in turn, seeing one after the other until the list is exhausted. Criteria preferences can be inferred from acceptance and rejection data to project future linear listings in an order that would better fit the user. The linear search (step 761) cycles to repeatedly search in order to look ahead and/or pre-calculate a tree in order to obtain a rapid response. While the selection between the linear search (step 761) and grid search (step 762) may default to the user's device ID, the user can select between the linear search (step 761) and grid search (step 762) to override the default. The linear search also allows the use of audio prompts and responses, so that a driver can make selections in circumstances where the driver may use audio response systems provided their use is safe, but would not be able to safely use text, video or screen interaction. Such audio prompts for response would advantageously be of an audible nature.

As an alternative, the driver or TSP can be given the option of using an "accept/reject" selection for each offered load or for other categories. The "accept/reject" can be responded to manually, by gesture or by audio response.

The presentation to the driver also allows direct response by the driver of calculated bids. If the system calculates a bid based on present bids, historical bid data and current data relating to transportation service requests and available transportation service providers, a driver or TSP can respond to the calculated bid on an "accept/reject" basis.

Both linear search (step 761) and grid search (step 762) use the loaded search parameters (step 759), and also use stored data comprising search criteria 765, inferred preferences 766 and public data 767. Additionally, grid search (step 762) uses driver profile data 768 and load history 769.

Driver profile data 768 and load history 769 both relate to drivers in the system, so both the linear search (step 761) and the grid search (step 762) are able to use profile information be provided by the driver. Both the linear search (step 761) and the grid search (step 762) are also available for drivers who have no profile or history with the system.

On completion of linear search (step 761) or grid search (step 762), a determination (step 771) is made as to whether one or more results are rendered from the search. If no results are rendered, the driver or TSP analysis (step 703) is re-initiated. If at least one result is rendered, the driver or TSP analysis (step 703) is completed and a load qualification process (step 780) is initiated. Load qualification is also initiated if invitation request (step 713) results (step 748) in a won auction. In the case of established driver (step 712) returning a single best load match (step 724), determination (step 771) is invoked to determine if there is at least one result.

Load qualification process (step 780) comprises load review (step 781), which renders search criteria 782) and inferred preferences 783. The search criteria are rendered by the load review. In reviewing the load(s) the driver reveals their search preferences, which are an output. The load review (step 781) is used to determine (step 785) if the load is confirmed. If the load is not confirmed, then the driver or TSP analysis (step 703) is re-initiated because there is no successful match. If the load is confirmed, a determination (step 791) is made as to whether the driver is registered with the system. If not, the system registers the driver is registered (step 792), and is invited to create a profile (step 793) (optional with the driver), which is stored as the driver profile 768. If the driver is already registered (step 791) or after registration (step 792) and optional profile creation (step 793), the driver or TSP is recorded as having agreed to deliver the load or is scheduled to deliver the load (step 795). The information regarding delivery of the delivery of the load is added to the load history database 769.

Push Bid Solicitation

Since the system is able to determine a high probability of a driver's need for a load and also determine with some accuracy the driver's preferences, it is possible to search for loads meeting the driver's preferences for which the driver will be available based on the driver's current schedule. Push notifications are then provided for loads that meet a specific driver's criteria even if that specific driver is not currently reviewing loads.

In addition, a driver recommendation engine is used to provide for best potential matches. The matches are based on lane, equipment, invitation history and pricing. The driver recommendation engine is generated by the bid selection process, such as described in connection with FIG. 2 or FIG. 6, using internal and external databases.

In order to provide push notification, the driver is notified based on a known communication method for the driver or a driver's stated communication method. By way of example, the driver may prefer a smartphone or mobile communication device app, email, SMS, or a phone call. This allows the system to present the data with a sensitivity to the driver's preferred communication device and method. The amount of information is also adjusted in accordance with the device and the driver's preferences:

SMS—just send minimal information on best match.
Email—send top ranked matches (no more than 3) and link to online selection.
Smartphone or Mobile Device App—show all potential matches, prioritized by match criteria, and allow swiping (or other device navigation) to decline or consider.

In addition to the preferred method of communication, the process of inviting the driver to bid and suggest pricing involves several considerations:

Limit invitations to drivers that have a chance of winning the reverse auction (e.g., don't invite all drivers and disappoint a large group),
Invite drivers outside of the system's database by mining public sources and driver pools,
Use a driver recommendation engine for best potential matches (internal & external) based on lane, equipment, invitation history and pricing,
Show the driver their potential for winning a load based on history of similar loads,
Provide status information on competitors to encourage bidding, e.g., who is leading the bidding, for how long and at what bid,
Alert drivers to changes in leading bid by opt-in preferred contact method,
Alert while in-transit based on new current location tracking,
Alert while in-transit based on new load availability,
Expand bidding based on participation and time constraints to next tier of drivers, and
Provide feedback to drivers following the bidding period: where they ranked, bid history, suggestions for winning the reverse auction.

Parsing Capacity Emails

The ability to parse email allows the acceptance of capacity emails in a free form format, or in a format selected by the sender of the email, and the conversion of the data for use by the system.

By parsing the email, an attempt is made to render the data contained in the email in a format suitable for the inclusion of the capacity in a database listing capacity. In some cases, the data may be defective and not parsable by the primary target recipient, e.g., a word processing document sent to a service that uses plain text submissions. Regardless, the data is still embedded in the email and since the system can parse the data, it is able to use the data, even with the target recipient who could not parse the original email. This may be accidental on the part of the sender, or, given that the system can parse the email, the sender can still send the mis-formatted data with the expectation that the system will pick up the email and broker the load.

Figure 8:
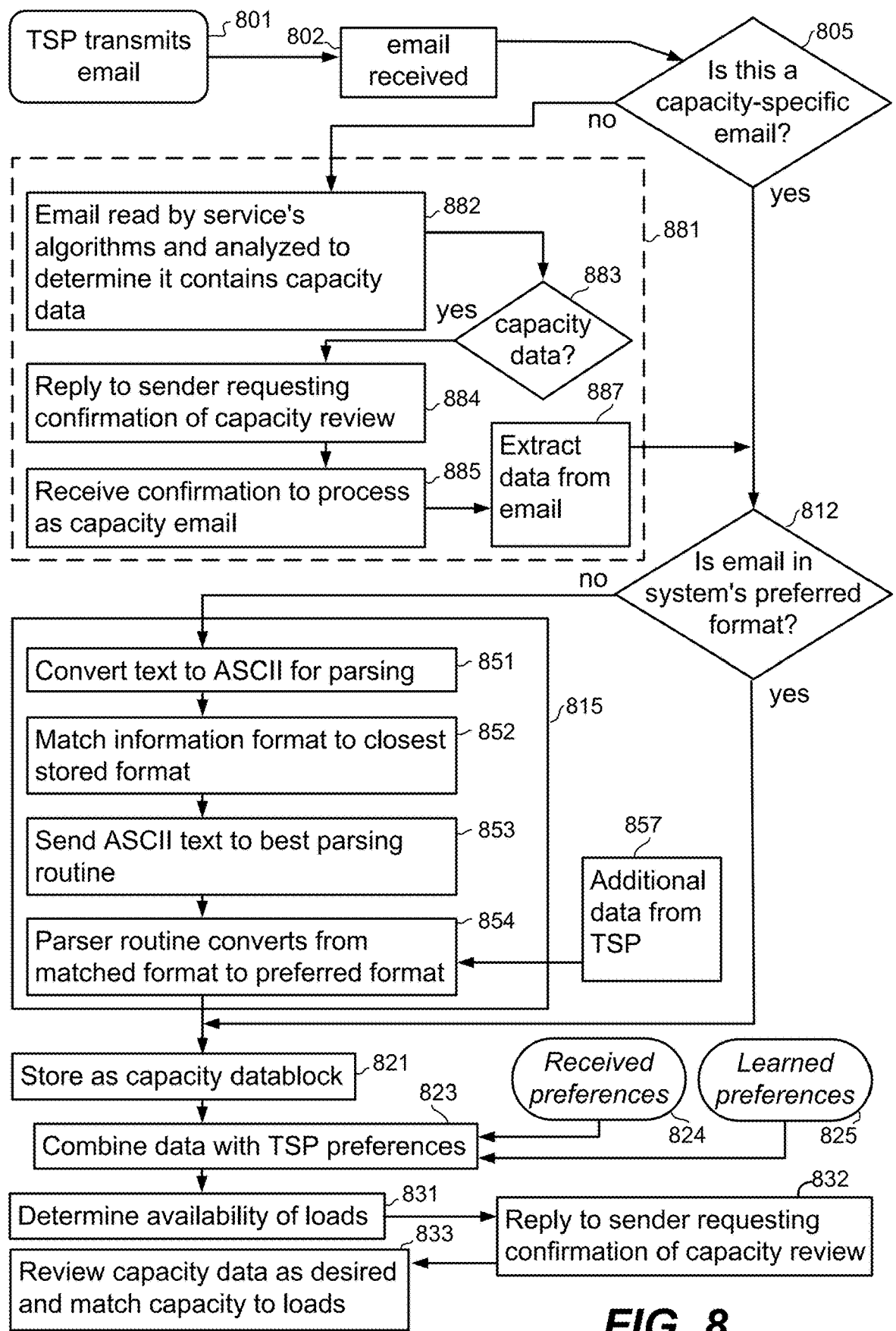
FIG. 8 is a flow diagram showing the receipt and parsing of capacity emails.

FIG. 8 is a flow diagram showing the receipt and parsing of capacity emails. In this non-limiting example, the service provides brokerage and brokerage aggregation for carrier load capacity of trucks. While the example describes capacity emails, other forms of communication can be used.

The review of capacity email is initiated when the TSP transmits an email (step 801), which the brokerage system is able to receive. In the case of emails or copies of communication transmitted by email, the brokerage system email address is included in one of the email destination headers (to:, cc:, bcc:, or other destination header). The brokerage system receives the email (step 802).

When received, a determination is made (step 805) as to whether the email is a capacity-specific email by examining the contents of the email for relevant subject matter and other characteristics of capacity-specific emails. If the email is a capacity-specific email, a further determination is made (step 812) as to whether the email contains data in the system's preferred format. If the email is not in the preferred format, the data is extracted and converted to the system's preferred format (step 815).

The data from email in the preferred format (step 812 "yes") or converted to the preferred format (step 815) is stored as a capacity datablock (step 821). Data in the datablock is combined with TSP preferences and qualification criteria (step 823) which includes preferences and qualification criteria received from the TSP or other sources (step 824), or from preferences and qualification criteria obtained by machine learning (step 825).

A determination of availability is made, in which loads are matched to the capacity (step 831) using the datablocks as combined with the TSP preference and qualification criteria. A reply is sent to the TSP requesting confirmation of the capacity (step 832). The capacity is then reviewed (step 833) as a prelude to bidding on loads based on the wrong criteria, in cases in which the TSP is no longer available, or otherwise wishes to decline the load.

In the case in which the email is not in the preferred format (step 812 "no"), the conversion to the preferred format (step 815) is performed by converting the text to ASCII or binary for parsing (step 851). The ASCII or binary-converted text is matched to the closest stored format obtained from a library of stored formats (step 852). This establishes the best parsing routine for parsing the data contained in the email, which is selected (step 853). The selected parsing routine is used to convert the ASCII or binary-converted text to a datablock in the preferred format, and the datablock in the preferred format is stored as the capacity datablock (step 821). Additional data may be obtained from the TSP if needed to provide a complete datablock (step 857) in the preferred format.

The specific stage in which the email is converted to a datablock is not important, so long as any data from the email necessary for processing be saved in the datablock.

Since the system has the capability of extracting and converting the email to the preferred format (step 815), data which is substantially in the preferred format, but with errors inconsistent with the preferred format can conveniently be rejected without losing the data. The data with errors are rejected for direct submission as-is; but instead are processed in the extracting and converting routine (step 815). In the extracting and converting routine (step 815), the errors are automatically corrected, so the rejected message is re-inserted with the errors corrected. This assures more reliable handling of errors in submitting the forms.

In an example implementation, a TSP trucking carrier, Supertruck Tommy, headquartered in Dallas Tex., has driver #7 in San Francisco, needs to be heading back to Dallas today. Supertruck Tommy sends an email to 15 people that work at different brokerages. This would correspond to 15 brokerages out of an estimated 20,000 brokerages in the industry, some with hundreds of employees, so the 15 brokers represent a small fraction of the industry.

Most of those recipients do not have a load right now picking up in San Francisco, so they just delete the email.

In the email, Supertruck Tommy includes the brokerage system email address <trucks@example.com> as one of the BCC recipients. The brokerage system receives the <trucks@example.com> email from Supertruck Tommy.

The brokerage system's email reader converts Supertruck Tommy's email to a preferred format. If the email contains formatted content or formatted attachments, such as Excel or .pdf attachments, these are converted to ASCII or binary text for parsing. The brokerage system's email parser then determines which general format Supertruck Tommy's email is closest to out of a database of typical information layout formats and, sends the ASCII or binary text of Supertruck Tommy's email to the best parser routine.

All emails received by <trucks@example.com> are read by the service's algorithms or machine-reviewed. An auto-reply is optionally generated with matching loads that match with available trucks. The target email address <trucks@example.com> is intended for messages or copies of messages indicating capacity and requesting a load. Therefore, nearly all emails received at <trucks@example.com>, sans spam and other irrelevant material, contain information about available trucks from various carriers. In general, each email is from one carrier and only has available trucks from that one sending carrier.

Since the brokerage system is intended to parse data related to capacity by TSPs, nearly all spam communications are automatically deleted by the same process that parses the email data. If the incoming message does not provide data indicating capacity, but still contains some information that suggests that it may be related to capacity by TSPs, the brokerage system may autorespond with a message requesting capacity information.

The parser then determines how many trucks are in Supertruck Tommy's email, and then for each truck determines, when the truck is available, where it is available, the type of truck it is (van, reefer, flatbed) and whether the truck have a specified destination described as "truck goal". This information is then entered into the brokerage system's searchable database.

From that point, some or all messages containing load information may be manually read. Therefore, in the case of emails intentionally directed to the <trucks@example.com> as capacity emails, and expected to contain capacity information, human reviewers can review the brokerage system's data to the original email to ensure the algorithms did their job.

The matching of capacity to shipments occurs if one of the brokerage system's shipper clients enters the load origin, destination, truck type and pick up date into the brokerage system. The brokerage system's matching algorithm then determines the strength or score of the match between trucks and loads by considering the difference between the truck and load origin (deadhead miles), truck goal to load destination, the difference between load pick up and truck availability, matching on truck type and frequently considering additional factors, which establish the qualification criteria. By way of non-limiting example, these factors may include:

1. number of loads that the carrier has hauled in last 30 days for that specific client of the brokerage system (client previously provided their load/transaction history to the brokerage system);
2. number of loads that the carrier has hauled in last 90 days for that specific client of the brokerage system;
3. number of loads that the carrier has hauled in last 360 days for that specific client of the brokerage system;
4. percent loads that the carrier has hauled for that specific brokerage system client that were delivered damage-free;
5. percent loads that the carrier has hauled for that specific brokerage system client that were delivered and picked up on time;
6. safety record of the carrier compared to other carriers;
7. whether the carrier has an appropriate authority;
8. whether the carrier has appropriate insurance;
9. the historical pricing of the carrier compared to others for multiple lanes;
10. the historical pricing of the carrier compared to others for the lane searched;
11. how old the carrier is (length of time in business);
12. number of trucks does the carrier has;
13. relative score of the carrier by a preferred crowd-sourced review site;
14. the relative score of the carrier by an aggregate of other reviews;
15. whether the carrier has been restricted by any other clients; and
16. other inputs Parsing of some of the data extracted from the capacity emails is a matter of direct text matching. For example "flatbed" or a word descriptive of a common field followed by a variable for that field would be directly parsable. It is likely that some fields will become evident because they follow a pattern or common association which is not immediately apparent when programming a parsing program. Since the associations and styles used in the capacity messages are likely to fit a pattern, it is possible to use machine learning to enhance the parsing of communications. Likewise, the use of time estimates and external factors, as described above, can be integrated into the machine learning. Thus, the brokerage system can learn how the time estimates and external factors affect the parsed data, and modify the parsed data accordingly, for example by changing the time of availability or making appropriate adjustments for driver hours of service. This also provides a degree of convenience for the TSP and driver because a brokered load can be expected to match the actual time that capacity is available, rather than solely based on the raw estimates of the TSP.

Interpretive Harvesting

In an email harvesting mode, all emails or similar communications (SMS text, instant messaging, audio messages, etc.) are machine parsed in an email harvesting routine. In doing so, it is desired that the sender be afforded privacy; otherwise it is unlikely that the person sending the messages would consent. The harvesting is accomplished by the brokerage system monitoring outgoing communications for indications of potential capacity. Examples would be communications related to arrival, delays in arrival, and location information.

This mode involves "background listening" to determine if relevant information is contained in the monitored messages. Since general communications are likely to be monitored, the monitoring is performed automatically, using computer analysis, but in a manner that does not involve auditing by human listeners. If the message is determined to be likely to include information relevant to capacity, an automated reply message is sent to the original sender, with capacity information extracted from the original message, inviting the original sender to either forward or accept forwarding of the extracted information for handling as a capacity email. The sender can provide additional information for inclusion with the forwarded message or otherwise linked to the forwarded message.

Advantageously, the original sender is also informed that the "background listening" is maintained as private, with forwarding of information extracted from the monitored messages being subject to approval by the original sender prior to being forwarded for further processing. The obtaining of data is accomplished as "blind extraction", in which the monitoring is performed without analysis of the email beyond extraction and parsing of capacity data.

Referring again to FIG. 8, the harvesting is accomplished with email or other communications in which the communication is not capacity-specific (step 805 "no"). If the email is not capacity-specific, it is not regarded as a capacity-specific email, but instead, the email harvesting routine is used to determine if the email contains information relevant to capacity.

If the email is not capacity-specific (step 805 "no"), the email is reviewed (step 881) by an automatic review process to determine if it contains data that can be used to construct a datablock. The email is read and analyzed to extract possible capacity data (step 882). A determination is made (step 883) whether the email contains capacity data, and if so (step 883 "yes"), a reply is automatically sent to the sender of the email requesting confirmation of a desire for capacity review (step 884). If the email is determined irrelevant to capacity (step 883 negative), the email is then ignored and discarded. The system then receives a confirmation from the sender of a desire to process the email as a capacity email (step 885), possibly with additional information relevant to capacity. The relevant data is extracted from the email (step 887) and processed to extract the data to suitable datablocks (step 812, et seq.)

Additionally, the confirmation or non-confirmation process (step 885) is used to provide data for machine learning to enhance the ability to analyze subsequent emails and determine if they are likely to contain capacity data (steps 882, 883). This allows the system to improve the parsing of general email correspondence without human review of information that the correspondents may consider private, in part by using non-private responses related to capacity and acceptance of loads. The machine learning can be used for general email analysis, and also to augment the analysis of emails from individual TSPs and drivers if, for example a correlation peculiar to the particular TSP or driver is detected.

CONCLUSION

The process uses one or more computing devices with which to query respondents, gather capacity data and then the bids, obtain criteria for the transportation request, store the bids in an aggregated bid database, calculate bid commissions or margins, match the bids from the aggregated bid database to provided prices transmit the bids, query other TSPs implementing particular categories of transportation services, and to determine if the transportation request meets requirements for the further predetermined category of transportation services based on the shipping lane. The one or more computing devices may be used to provide information concerning an identity of the TSP or contact information for the TSP to the entity submitting the transportation request. In addition, the process uses one or more computing devices to provide estimates of times for further pick-ups, the effect of location and of external factors on expected arrival times, calculating revenue, cost and profit of backhauls or next leg trips. Further operations involving one or more computing devices comprise querying at least one of on-line databases or the respondent concerning qualification criteria of the TSP, and to look up the respondent's reputation in one or more databases and to query on-line databases concerning the qualification criteria of the TSP.

While communication data is described in the context of text communication, the communication may be voice, as either a normal conversational phone call or a voice call intended to be directly converted to data (e.g., voice response). The data obtained from such voice phone calls may be parsed automatically or manually in order to input the data. Since the system is able to parse the data and use machine learning to develop data parsing capabilities, it is not necessary to format the transcription of the voice call. This is expected to reduce errors because successful data input is not dependent on properly structuring the data at the transcription end. Telephone calls or other communications may be generated to inform TSPs about available capacity and to offer a load to a TSP. Similarly, it is expected that telephone calls or other communication will be received from TSPs with information about available capacity and loads.

If multimodal transportation services meet acceptance criteria for the transportation request, one or more computing devices may be used to determine if the transportation request meets requirements for the multimodal transportation services based on the shipping lane, and to query TSPs of multimodal transportation services. One or more computing devices may be used to determine a cost estimate for a destination leg of the multimodal transportation services based on at least one of historic data or current bid data. One or more computing devices may be used to generate the transportation documentation.

While the examples of communication describe email, it is possible for the communication functions to be performed by email, web, SMS, interactive voice response (IVR), telephone communications not using IVR, other types of voice recognition systems and other suitable interfaces.

It will be understood that many additional changes in the details, steps and procedures, which have been herein described and illustrated to explain the nature of the subject matter, may be made by those skilled in the art within the principle and scope of the invention as expressed in the appended claims.

What is claimed is:

1. A method for matching capacity to provide transportation services with a specified demand for transportation services in accordance with capabilities and business practices of a transportation service provider providing the transportation services, the method comprising:
receiving communication from a transportation service provider for consideration as having information indicating capacity data indicating availability of the transportation service provider to provide transportation services;
parsing the communication for the capacity data;
formatting the capacity data to a preferred data format, wherein the parsing and formatting comprises:
identifying one or more features of the capacity data;
comparing the parsed communication to a plurality of stored formats for capacity data;
in the case of the parsed communication matching a format of one of the stored formats for capacity data, associating the data with that stored format and retrieving the data from the communication based on the association;
in the case of the parsed communication not matching a format of one of the stored formats for capacity data, but substantially corresponding to that format, extracting or reformatting the data and associating the data with that stored format and retrieving the data from the communication based on an association of the extracted or reformatted data with that stored format;
storing the capacity data formatted to the preferred data format;
reviewing the stored capacity data to determine if the stored capacity data accurately reflects capacity indicated by the received communication;
using machine learning to automatically determine patterns of the parsed data so as to associate subsequently-received data with the stored formats;
using one or more computing devices to automatically match a demand for transportation services with the capacity to provide transportation services; and
using machine learning to automatically determine user-defined and non-user-defined preference criteria and add to retrieved data as preference data for filtering and ranking as inferred positive and negative preferences.

2. The method of claim 1, further comprising:
said using one or more computing devices to automatically match a demand for transportation services with the capacity to provide transportation services comprising:
using one or more computing devices to automatically determine one or more categories of transportation services met by capabilities of the transportation service provider as indicated by using the stored capacity data formatted to the preferred data format;
using one or more computing devices to automatically retrieve preference data and performance data concerning the transportation service provider and to apply at least one category of the retrieved preference data and performance data to the transportation service provider for use in combination with the one or more categories of transportation services met by the capabilities of the transportation service provider as a candidate service interest;
using the candidate service interest to match the transportation service provider to the specified demand for transportation services;
using one or more computing devices to automatically obtain competitive bids to meet the specified demand for transportation services, and offer the transportation service provider inclusion in the competitive bids based on the candidate service interest;
in the case of the transportation service provider with the candidate service interest winning the bid, arranging provision of the transportation service; and
in the case of the transportation service provider with the candidate service interest losing the bid, repeating the sequence of using the candidate service interest to match the transportation service provider to the specified demand for transportation services.

3. The method of claim 1, further comprising using machine learning to automatically determine non-user-defined preference criteria and add to the retrieved preference data and performance data for filtering and ranking as inferred positive and negative preferences.

4. The method of claim 3, further comprising selecting, criteria for selecting potential loads as transportation services based on driver load history, the criteria selected from the group consisting of:
lanes,
pricing,
reliability,
win/loss ratio,
cancellations,
on-time delivery, and
the driver or transportation service provider (TSP) entity.

5. The method of claim 1, further comprising using current activity of the driver in combination with capabilities of the transportation service provider and the retrieved preferences to modify the candidate service interest, thereby affording the benefits of automated evaluation of preferences while avoiding restricting the driver to the automated selection process.

6. The method of claim 1, further comprising:
using location tracking to adjust the availability of the transportation service provider to provide transportation services; and
alerting the transportation service provider of availability of the specified demand for transportation services while in-transit based on new current location tracking.

7. The method of claim 1, further comprising:
providing an initial review of received communication to determine if the received communication fits a pattern of capacity communications, without human review of data from the communication;
in the case of a determination indicating that the received communication fits the pattern of capacity communications, replying with an invitation to match the demand for transportation services with the capacity to provide transportation services; and
in the case of receiving an acceptance of the invitation, continuing with parsing the communication, so as to match the capacity with the specified demand.

8. The method of claim 1, further comprising:
receiving, as the communication from the transportation service provider, an email, whereby the received email comprises one or more of an email directly sent for parsing, a directly forwarded email and an email forwarded through a proxy (email alias).

9. A method for matching transportation services with a specified demand for transportation services in accordance with capabilities and business practices of a transportation service provider providing the transportation services, the method comprising:
a step of receiving communication from a transportation service provider for consideration as having information indicating capacity data indicating availability of the transportation service provider to provide transportation services;
a step of parsing the communication for the capacity data;
a step of formatting the capacity data to a preferred data format, wherein the parsing and formatting step comprises:
identifying one or more features of the capacity data;
comparing the parsed communication to a plurality of stored formats for capacity data;
in the case of the parsed communication matching a format of one of the stored formats for capacity data, associating the data with that stored format and retrieving the data from the communication based on the association;
in the case of the parsed communication not matching a format of one of the stored formats for capacity data, but substantially corresponding to that format, extracting or reformatting the data and associating the data with that stored format and retrieving the data from the communication based on an association of the extracted or reformatted data with that stored format;
a step of storing the capacity data formatted to the preferred data format;
a step of reviewing the stored capacity data to determine if the stored capacity data accurately reflects capacity indicated by the received communication;
using machine learning to automatically determine patterns of the parsed data so as to associate subsequently-received data with the stored formats;
a step of using one or more computing devices to automatically match a demand for transportation services with the capacity to provide transportation services; and
using machine learning to automatically determine user-defined or non-user-defined preference criteria and add to retrieved data as preference data for filtering and ranking as inferred positive and negative preferences.

10. The method of claim 9, further comprising:
said using one or more computing devices to automatically match a demand for transportation services with the capacity to provide transportation services comprising:
using one or more computing devices to automatically determine one or more categories of transportation services met by capabilities of the transportation service provider as indicated by using the stored capacity data formatted to the preferred data format;
using one or more computing devices to automatically retrieve preference data and performance data concerning the transportation service provider and to apply at least one category of the retrieved preference data and performance data to the transportation service provider for use in combination with the one or more categories of transportation services met by the capabilities of the transportation service provider as a candidate service interest;
using the candidate service interest to match the transportation service provider to the specified demand for transportation services;
using one or more computing devices to automatically obtain competitive bids to meet the specified demand for transportation services, and offer the transportation service provider inclusion in the competitive bids based on the candidate service interest;
in the case of the transportation service provider with the candidate service interest winning the bid, arranging provision of the transportation service; and
in the case of the transportation service provider with the candidate service interest losing the bid, repeating the sequence of using the candidate service interest to match the transportation service provider to the specified demand for transportation services.

11. The method of claim 9, further comprising using machine learning to automatically determine non-user-defined preference criteria and add to the retrieved preference data for filtering and ranking as inferred positive and negative preferences.

12. The method of claim 9, further comprising selecting, criteria for selecting potential loads as transportation services based on driver load history, the criteria selected from the group consisting of:
lanes,
pricing,
reliability,
win/loss ratio,
cancellations,
on-time delivery.

13. The method of claim 9, further comprising using current activity of the driver in combination with capabilities of the transportation service provider and the retrieved preferences to modify the candidate service interest, thereby affording the benefits of automated evaluation of preferences while avoiding restricting the driver to the automated selection process.

14. The method of claim 9, further comprising:
using location tracking to adjust the availability of the transportation service provider to provide transportation services;
alerting the transportation service provider of availability of the specified demand for transportation services while in-transit based on new current location tracking.

15. The method of claim 9, further comprising:
providing an initial review of received communication to determine if the received communication fits a pattern of capacity communications, without human review of data from the communication;
in the case of a determination indicating that the received communication fits the pattern of capacity communications, replying with an invitation to match the demand for transportation services with the capacity to provide transportation services; and
in the case of receiving an acceptance of the invitation, continuing with parsing the communication, so as to match the capacity with the specified demand.

16. A method for monitoring communications to extract one or more categories of data, the method comprising:
using one or more computing devices to monitor at least a predetermined portion of the communications;
parsing the communication for indications of the one or more categories of data, the parsing comprising:

identifying one or more features of said one or more categories of data;
comparing the parsed communication to a plurality of stored formats for said one or more categories of data;
in the case of the parsed communication matching a format of one of the stored formats for said one or more categories of data, associating the data with that stored format and retrieving the data from the communication based on the association;
in the case of the parsed communication not matching a format of one of the stored formats for said one or more categories of data, but substantially corresponding to that format, associating the data as substantially corresponding to that stored format;
providing an initial review of received communication to determine if the received communication fits a pattern of capacity communications, without human review of data from the communication;
providing, to the person transmitting the monitored communications, an indication of the initial review for acceptance or rejection of use of the data obtained from the received communication, and receiving from the person transmitting the monitored communications an accept/reject response for the use of said one or more categories of data;
using machine learning to automatically determine patterns of the parsed data so as to associate subsequently-received data with the stored formats; and
in the case of a determination indicating that the received communication fits the pattern of capacity communications, storing or transmitting said one or more categories of data.

17. The method of claim 16, further comprising:
extracting, as said one or more categories of data, capacity to provide transportation services;
upon receiving an "accept" as the accept/reject response for the use of said one or more categories of data, extracting said capacity to provide transportation services, matching capacity to provide transportation services with a specified demand for transportation services in accordance with capabilities and business practices of a transportation service provider providing the transportation services by a method comprising:
parsing the communication for the capacity data;
formatting the capacity data to a preferred data format, wherein the parsing and formatting comprises:
identifying one or more features of the capacity data;
comparing the parsed communication to a plurality of stored formats for capacity data;
in the case of the parsed communication matching a format of one of the stored formats for capacity data, associating the data with that stored format and retrieving the data from the communication based on the association;
in the case of the parsed communication not matching a format of one of the stored formats for capacity data, but substantially corresponding to that format, extracting or reformatting the data and associating the data with that stored format and retrieving the data from the communication based on an association of the extracted or reformatted data with that stored format;
storing the capacity data formatted to the preferred data format;
reviewing the stored capacity data to determine if the stored capacity data accurately reflects capacity indicated by the received communication;
using machine learning to automatically determine patterns of the parsed data so as to associate subsequently-received data with the stored formats;
using one or more computing devices to automatically match a demand for transportation services with the capacity to provide transportation services; and
using machine learning to automatically determine non-user-defined preference criteria and add to retrieved data as preference data for filtering and ranking as inferred positive and negative preferences.

18. The method of claim 17, further comprising:
the monitored communications comprising email,
whereby the monitored email comprises one or more of an email directly sent for parsing, a directly forwarded email and an email forwarded through a proxy (email alias).

* * * * *